United States Patent
Kim et al.

(10) Patent No.: US 11,087,718 B2
(45) Date of Patent: Aug. 10, 2021

(54) ELECTRONIC DEVICE, AND METHOD FOR CONTROLLING OPERATION OF ELECTRONIC DEVICE

(71) Applicant: Samsung Electronics Co., Ltd., Gyeonggi-do (KR)

(72) Inventors: Seungjin Kim, Gyeonggi-do (KR); Sungjun Lee, Gyeonggi-do (KR); Gwanghui Lee, Gyeonggi-do (KR); Woojun Jung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/325,221

(22) PCT Filed: Aug. 21, 2017

(86) PCT No.: PCT/KR2017/009089
§ 371 (c)(1),
(2) Date: Feb. 13, 2019

(87) PCT Pub. No.: WO2018/038483
PCT Pub. Date: Mar. 1, 2018

(65) Prior Publication Data
US 2019/0206367 A1    Jul. 4, 2019

(30) Foreign Application Priority Data
Aug. 23, 2016    (KR) .................... 10-2016-0107236

(51) Int. Cl.
*G09G 5/36* (2006.01)
*G06F 1/12* (2006.01)
(Continued)

(52) U.S. Cl.
CPC ............... *G09G 5/363* (2013.01); *G06F 1/12* (2013.01); *G06F 3/14* (2013.01); *G06F 3/147* (2013.01);
(Continued)

(58) Field of Classification Search
CPC .............. G09G 5/363; G06T 1/20; G06F 1/12
See application file for complete search history.

(56) References Cited

U.S. PATENT DOCUMENTS

| 5,565,897 A | 10/1996 | Kikinis et al. |
| 2005/0209802 A1 | 9/2005 | Taraci |

(Continued)

FOREIGN PATENT DOCUMENTS

| EP | 3 056 983 A1 | 8/2016 |
| EP | 3 418 879 A1 | 12/2018 |
| WO | 2006/068985 A2 | 6/2006 |

OTHER PUBLICATIONS

European Search Report dated Apr. 2, 2019.
European Search Report dated Jun. 21, 2019.

*Primary Examiner* — Matthew Salvucci
(74) *Attorney, Agent, or Firm* — Cha & Reiter, LLC.

(57) ABSTRACT

An electronic device according to one embodiment of the present invention can comprise a display panel, a display controller, a memory, and a processor electrically connected to the display panel, the display controller, and the memory. The memory can store instructions, when executed, which allow the process to: draw an image in response to a periodic synchronization signal; compose the drawl image in response to the synchronization signal after the drawing of the image; transmit the composed image to the display controller in response to synchronization signal after the composing of the image; measure, after the transmitting of the composed image, a first standby time until the next synchronization signal is generated; perform control such (Continued)

that the display panel displays an image in response to the generation of the next synchronization signal; determine a first offset value on the basis of the first standby time; and determine an image composition time point by applying the first offset value to the periodic synchronization Additionally, various examples are possible.

14 Claims, 17 Drawing Sheets

(51) Int. Cl.
*G06T 1/20* (2006.01)
*G06T 11/60* (2006.01)
*H04M 1/725* (2021.01)
*G06F 3/14* (2006.01)
*G06F 3/147* (2006.01)

(52) U.S. Cl.
CPC ............... *G06T 1/20* (2013.01); *G06T 11/60* (2013.01); *H04M 1/725* (2013.01); *G09G 2310/08* (2013.01); *G09G 2340/10* (2013.01)

(56) References Cited

U.S. PATENT DOCUMENTS

| | | |
|---|---|---|
| 2006/0132491 A1 | 6/2006 | Riach et al. |
| 2012/0221740 A1 | 8/2012 | Arsenio |
| 2012/0262463 A1 | 10/2012 | Bakalash et al. |
| 2014/0063069 A1 | 3/2014 | Prabakaran |
| 2015/0301585 A1* | 10/2015 | Noro ............ G06F 1/3243 345/502 |
| 2016/0042488 A1 | 2/2016 | Campbell et al. |
| 2016/0049105 A1 | 2/2016 | Ding et al. |
| 2016/0188279 A1 | 6/2016 | Rajamani et al. |
| 2016/0202818 A1 | 7/2016 | Hyun et al. |
| 2016/0247484 A1 | 8/2016 | Chen et al. |
| 2019/0096358 A1 | 3/2019 | Zhao et al. |

* cited by examiner

ELECTRONIC DEVICE, AND METHOD FOR CONTROLLING OPERATION OF ELECTRONIC DEVICE

CLAIM OF PRIORITY

This application is a National Phase Entry of PCT International Application No. PCT/KR2017/009089, which was filed on Aug. 21, 2017 and claims a priority to Korean Patent Application No. 10-2016-0107236, which was filed on Aug. 23, 2016, the contents of which are incorporated herein by reference.

TECHNICAL FIELD

Various embodiments of the present disclosure relate to an electronic device which configures and displays an image in response to a user input and a method of controlling an operation of the electronic device.

BACKGROUND ART

Recently, various electronic devices, such as smartphones, tablet PCs, portable multimedia players (PMPs), personal digital assistants (PDAs), laptop personal computers (PCs) and wearable devices, can provide various functions (e.g., social network service (SNS), the Internet, multimedia, the photographing and execution of photos and video, and a document task) in addition to a call function.

The computing graphic system of the electronic device configures and displays an image in response to a user input. In this case, if the time taken to display an image on a display after the input of a user is received is reduced, screen switching can be performed more smoothly. A processing time is delayed or an unnecessary latency time may occur depending on a method of processing an image to be displayed on a screen in the electronic device. Accordingly, in order to enhance display performance of an electronic device, there is a need for a method of improving responsiveness of the electronic device according to the input of a user.

DISCLOSURE OF INVENTION

Technical Problem

Various embodiments of the present disclosure provide an electronic device capable of improving user responsiveness according to a user input and a method of controlling an operation of the electronic device.

Solution to Problem

An electronic device according to various embodiments of the present disclosure may include a display panel, a display controller, memory, and a processor electrically connected to the display panel, the display controller and the memory. In accordance with one embodiment, the memory may be configured to store instructions enabling the processor to draw an image in response to a periodic synchronization signal, compose the image in response to the synchronization signal after the image drawing, deliver the composed image to the display controller in response to the synchronization signal after the image composition, measure a first standby time until a next synchronization signal is generated after the delivery of the composed image, control the display panel to display an image in response to the generation of the next synchronization signal, determine a first offset value based on the first standby time, and determine image composition timing by applying the first offset value to the periodic synchronization signal.

A method of controlling an operation of an electronic device according to various embodiments of the present disclosure may include an operation of drawing an image in response to a periodic synchronization signal, an operation of composing the drawn image in response to the synchronization signal after the image drawing, an operation of delivering the composed image to a display controller in response to the synchronization signal after the image composition, an operation of measuring a first standby time until a next synchronization signal is generated after the delivery of the composed image, an operation of displaying an image on a display panel in response to the generation of the next synchronization signal, an operation of determining a first offset value based on the first standby time, and an operation of determining image composition timing by applying the first offset value to the periodic synchronization signal.

Advantageous Effects of Invention

The electronic device and the method of controlling an operation of the electronic device according to various embodiments of the present disclosure can minimize a latency time when an image is processed by adjusting timing of an operation for an image configuration.

The electronic device and the method of controlling an operation of the electronic device according to various embodiments of the present disclosure can improve responsiveness according to a user input.

Optimized screen display and switching can be provided in response to a user input according to various embodiments of the present disclosure.

MODE FOR THE INVENTION

Figure 1:
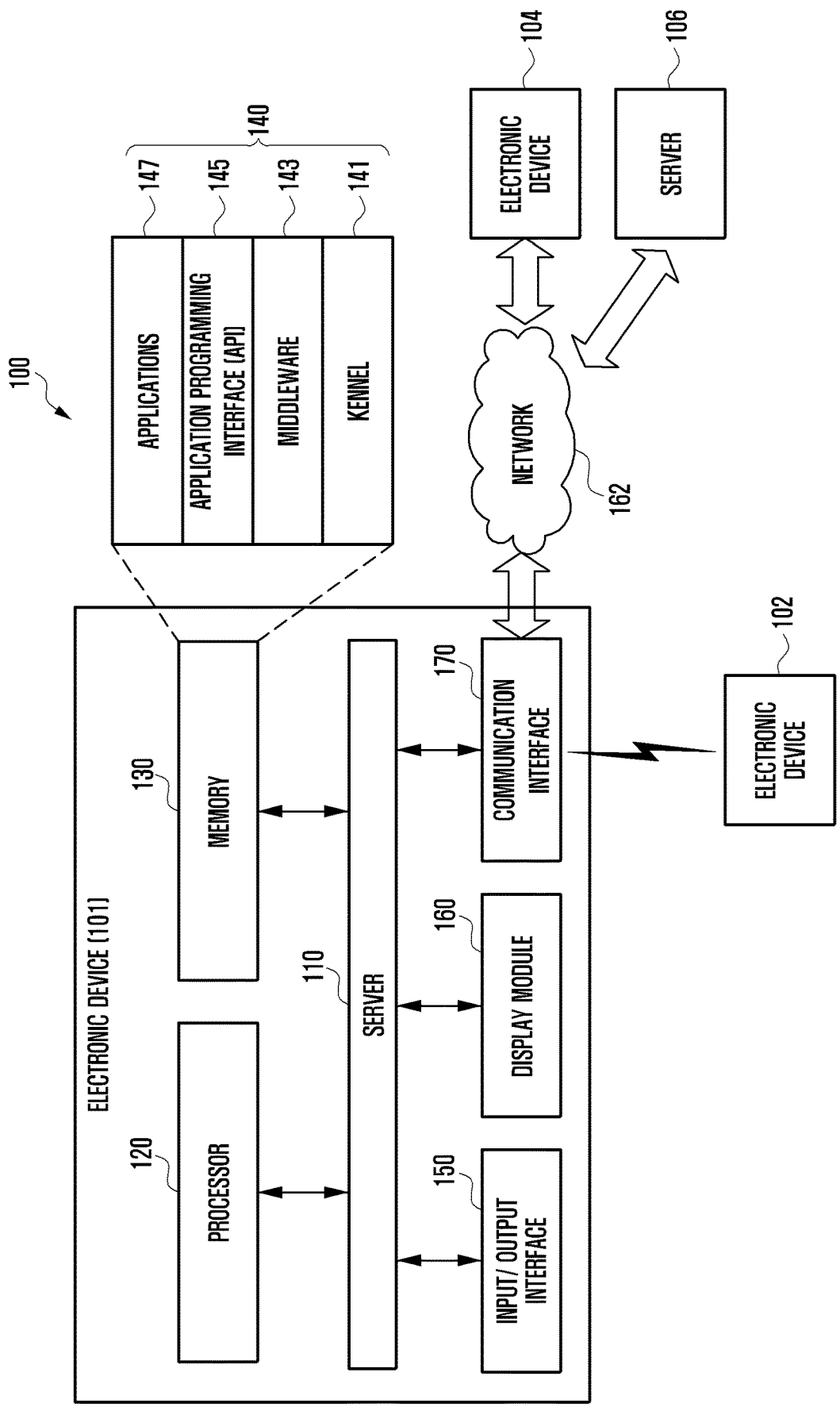
FIG. 1 shows an electronic device within a network environment according to various embodiments of the present disclosure.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar elements may be marked by similar reference numerals. The terms of a singular form may include plural forms unless otherwise specified. In this disclosure, the expressions "A or B", "at least one of A or/and B", or "one or more of A or/and B", and the like may include any and all combinations of one or more of the associated listed items. The terms, such as "first", "second", and the like may be used to refer to various elements regardless of the order and/or the priority and to distinguish the relevant elements from other elements, but do not limit the elements. When an element (e.g., a first element) is referred to as being "(operatively or communicatively) coupled with/to" or "connected to" another element (e.g., a second element), the element may be directly coupled with/to or connected to the other element or an intervening element (e.g., a third element) may be present.

According to the situation, the expression "configured to" used in this disclosure may be used as, for example, the expression "suitable for", "having the capacity to", "adapted to", "made to", "capable of", or "designed to" in hardware or software. The expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit). According to various embodiments, the electronic device may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, media boxes (e.g., Samsung HomeSync™, Apple TV™, or Google TV™), game consoles (e.g., Xbox™ or PlayStation™), to electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, drones, automatic teller's machines (ATMs), points of sales (POSs) of stores, or internet of things (e.g., light bulbs, various sensors, sprinkler devices, fire alarms, thermostats, street lamps, toasters, exercise equipment, hot water tanks, heaters, boilers, and the like). According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be a flexible electronic device or a combination of two or more above-described devices. Furthermore, an electronic device according to an embodiment of this disclosure may not be limited to the above-described electronic devices. In this disclosure, the term "user" may refer to a person who uses an electronic device or may refer to a device (e.g., an artificial intelligence electronic device) that uses the electronic device.

Referring to FIG. 1, according to various embodiments, an electronic device 101 in a network environment is described. The electronic device 101 may include a bus 110, a processor 120, a memory 130, an input/output interface 150, a display 160, and a communication interface 170. According to an embodiment, the electronic device 101 may not include at least one of the above-described elements or may further include other element(s). The bus 110 may interconnect the above-described elements 110 to 170 and may include a circuit for conveying communications (e.g., a control message and/or data) among the above-described elements. The processor 120 may include one or more of a central processing unit (CPU), an application processor (AP), or a communication processor (CP). For example, the processor 120 may perform an arithmetic operation or data processing associated with control and/or communication of at least other elements of the electronic device 101.

The memory 130 may include a volatile and/or nonvolatile memory. For example, the memory 130 may store instructions or data associated with at least one other element(s) of the electronic device 101. According to an embodiment, the memory 130 may store software and/or a program 140. The program 140 may include, for example, a kernel 141, a middleware 143, an application programming interface (API) 145, and/or an application program (or "an application") 147. At least a part of the kernel 141, the middleware 143, or the API 145 may be referred to as an "operating system (OS)". For example, the kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete elements of the electronic device 101 so as to control or manage system resources.

The middleware 143 may perform, for example, a mediation role such that the API 145 or the application program 147 communicates with the kernel 141 to exchange data. Furthermore, the middleware 143 may process one or more task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147 and may process the one or more task requests. The API 145 may be an interface through which the application program 147 controls a function provided by the kernel 141 or the middleware 143, and may include, for example, at least one interface or function (e.g., a command or an instruction) for a file control, a window control, image processing, a character control, or the like. The input/output interface 150 may transmit an instruction or data input from a user or another external device, to other element(s) of the electronic device 101 or may output an instruction or data, received from other element(s) of the electronic device 101, to a user or another external device.

The display 160 may include, for example, a liquid crystal display (LCD), a light-emitting diode (LED) display, an organic LED (OLED) display, a microelectromechanical systems (MEMS) display, or an electronic paper display. The display 160 may display, for example, various contents (e.g., a text, an image, a video, an icon, a symbol, and the like) to a user. The display 160 may include a touch screen and may receive, for example, a touch, gesture, proximity, or hovering input using an electronic pen or a part of a user's body. For example, the communication interface 170 may establish communication between the electronic device 101 and an external device (e.g., the first electronic device 102, the second electronic device 104, or the server 106). For example, the communication interface 170 may be connected to the network 162 over wireless communication or wired communication to communicate with the external device (e.g., the second electronic device 104 or the server 106).

For example, the wireless communication may include cellular communication using at least one of long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like. The wireless communication may include at least one of wireless fidelity (Wi-Fi), Bluetooth, Bluetooth low energy (BLE), Zigbee, near field communication (NFC), magnetic stripe transmission (MST), radio frequency (RF), a body area network, or the like. According to an embodiment, the wireless communication may include GNSS. The GNSS may be one of, for example, a global positioning system (GPS), a global navigation satellite system (Glonass), a Beidou navigation satellite system (hereinafter referred to as "Beidou"), or an European global satellite-based navigation system (hereinafter referred to as "Galileo"). Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), power line communication, a plain old telephone service (POTS), or the like. The network 162 may include at least one of telecommunications networks, for example, a computer network (e.g., LAN or WAN), an Internet, or a telephone network.

Each of the first and second external electronic devices 102 and 104 may be a device of which the type is different from or the same as that of the electronic device 101. According to various embodiments, all or a portion of operations that the electronic device 101 will perform may be executed by another or plural electronic devices (e.g., the first electronic device 102, the second electronic device 104 or the server 106). According to an embodiment, in the case where the electronic device 101 executes any function or service automatically or in response to a request, the electronic device 101 may not perform the function or the service internally, but, alternatively additionally, it may request at least a portion of a function associated with the electronic device 101 at other electronic device (e.g., the electronic device 102 or 104 or the server 106). The other electronic device (e.g., the electronic device 102 or 104 or the server 106) may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
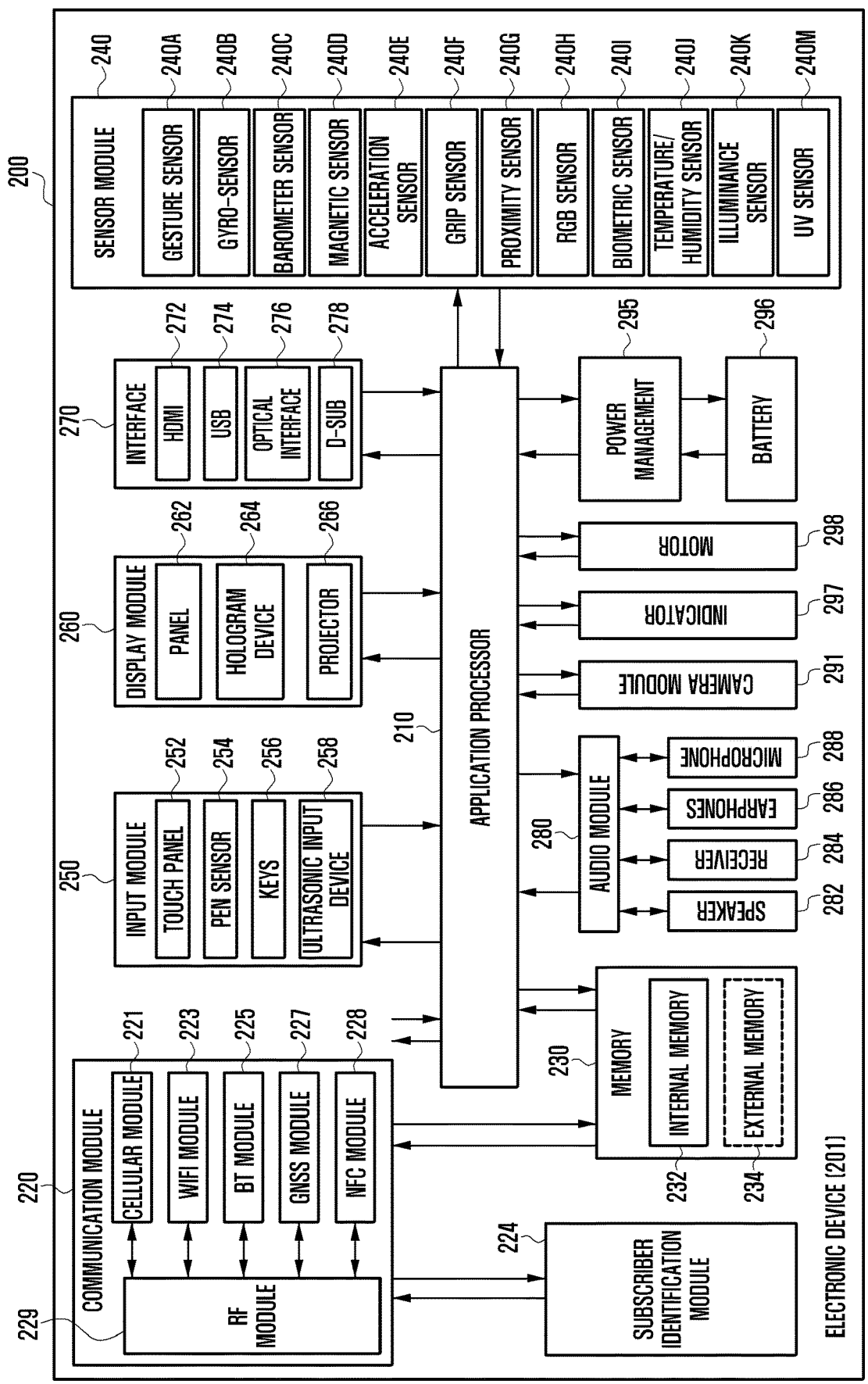
FIG. 2 is a block diagram of an electronic device according to various embodiments of the present disclosure.

FIG. 2 illustrates a block diagram of an electronic device, according to various embodiments. An electronic device 201 may include, for example, all or a part of the electronic device 101 illustrated in FIG. 1. The electronic device 201 may include one or more processors (e.g., an application processor (AP)) 210, a communication module 220, a subscriber identification module 224, a memory 230, a sensor module 240, an input device 250, a display 260, an interface 270, an audio module 280, a camera module 291, a power management module 295, a battery 296, an indicator 297, and a motor 298. For example, the processor 210 may be implemented with a System on Chip (SoC). According to an embodiment, the processor 210 may further include a graphic processing unit (GPU) and/or an image signal processor. The processor 210 may include at least a part (e.g., a cellular module 221) of elements illustrated in FIG. 2. The processor 210 may load an instruction or data, which is received from at least one of other elements (e.g., a nonvolatile memory), into a volatile memory and process the loaded instruction or data. The processor 210 may store result data in the nonvolatile memory.

The communication module 220 may be configured the same as or similar to the communication interface 170 of FIG. 1. The communication module 220 may include the cellular module 221, a Wi-Fi module 223, a Bluetooth (BT)

module 225, a GNSS module 227, a near field communication (NFC) module 228, and a radio frequency (RF) module 229. The cellular module 221 may provide, for example, voice communication, video communication, a character service, an Internet service, or the like over a communication network. According to an embodiment, the cellular module 221 may perform discrimination and authentication of the electronic device 201 within a communication network by using the subscriber identification module (e.g., a SIM card) 224. According to an embodiment, the cellular module 221 may perform at least a portion of functions that the processor 210 provides. According to an embodiment, the cellular module 221 may include a communication processor (CP). According to an embodiment, at least a part (e.g., two or more) of the cellular module 221, the Wi-Fi module 223, the BT module 225, the GNSS module 227, or the NFC module 228 may be included within one Integrated Circuit (IC) or an IC package. For example, the RF module 229 may transmit and receive a communication signal (e.g., an RF signal). For example, the RF module 229 may include a transceiver, a power amplifier module (PAM), a frequency filter, a low noise amplifier (LNA), an antenna, or the like. According to another embodiment, at least one of the cellular module 221, the Wi-Fi module 223, the BT module 225, the GNSS module 227, or the NFC module 228 may transmit and receive an RF signal through a separate RF module. The subscriber identification module 224 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 230 (e.g., the memory 130) may include an internal memory 232 or an external memory 234. For example, the internal memory 232 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory, a hard drive, or a solid state drive (SSD). The external memory 234 may include a flash drive such as compact flash (CF), secure digital (SD), micro secure digital (Micro-SD), mini secure digital (Mini-SD), extreme digital (xD), a multimedia card (MMC), a memory stick, or the like. The external memory 234 may be operatively and/or physically connected to the electronic device 201 through various interfaces.

The sensor module 240 may measure, for example, a physical quantity or may detect an operation state of the electronic device 201. The sensor module 240 may convert the measured or detected information to an electric signal. For example, the sensor module 240 may include at least one of a gesture sensor 240A, a gyro sensor 240B, a barometric pressure sensor 240C, a magnetic sensor 240D, an acceleration sensor 240E, a grip sensor 240F, the proximity sensor 240G, a color sensor 240H (e.g., red, green, blue (RGB) sensor), a biometric sensor 240I, a temperature/humidity sensor 240J, an illuminance sensor 240K, or an UV sensor 240M. Although not illustrated, additionally or generally, the sensor module 240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one or more sensors included therein. According to an embodiment, the electronic device 201 may further include a processor that is a part of the processor 210 or independent of the processor 210 and is configured to control the sensor module 240. The processor may control the sensor module 240 while the processor 210 remains at a sleep state.

The input device 250 may include, for example, a touch panel 252, a (digital) pen sensor 254, a key 256, or an ultrasonic input unit 258. For example, the touch panel 252 may use at least one of capacitive, resistive, infrared and ultrasonic detecting methods. Also, the touch panel 252 may further include a control circuit. The touch panel 252 may further include a tactile layer to provide a tactile reaction to a user. The (digital) pen sensor 254 may be, for example, a part of a touch panel or may include an additional sheet for recognition. The key 256 may include, for example, a physical button, an optical key, or a keypad. The ultrasonic input device 258 may detect (or sense) an ultrasonic signal, which is generated from an input device, through a microphone (e.g., a microphone 288) and may check data corresponding to the detected ultrasonic signal.

The display 260 (e.g., the display 160) may include a panel 262, a hologram device 264, a projector 266, and/or a control circuit for controlling the panel 262, the hologram device 264, or the projector 266. The panel 262 may be implemented, for example, to be flexible, transparent or wearable. The panel 262 and the touch panel 252 may be integrated into a single module. According to an embodiment, the panel 262 may include a pressure sensor (or force sensor) that measures the intensity of touch pressure by a user. The pressure sensor may be implemented integrally with the touch panel 252, or may be implemented as at least one sensor separately from the touch panel 252. The hologram device 264 may display a stereoscopic image in a space using a light interference phenomenon. The projector 266 may project light onto a screen so as to display an image. For example, the screen may be arranged in the inside or the outside of the electronic device 201. The interface 270 may include, for example, a high-definition multimedia interface (HDMI) 272, a universal serial bus (USB) 274, an optical interface 276, or a D-subminiature (D-sub) 278. The interface 270 may be included, for example, in the communication interface 170 illustrated in FIG. 1. Additionally or generally, the interface 270 may include, for example, a mobile high definition link (MHL) interface, a SD card/multi-media card (MMC) interface, or an infrared data association (IrDA) standard interface.

The audio module 280 may convert a sound and an electric signal in dual directions. At least a part of the audio module 280 may be included, for example, in the input/output interface 150 illustrated in FIG. 1. The audio module 280 may process, for example, sound information that is input or output through a speaker 282, a receiver 284, an earphone 286, or the microphone 288. For example, the camera module 291 may shoot a still image or a video. According to an embodiment, the camera module 291 may include at least one or more image sensors (e.g., a front sensor or a rear sensor), a lens, an image signal processor (ISP), or a flash (e.g., an LED or a xenon lamp). The power management module 295 may manage, for example, power of the electronic device 201. According to an embodiment, a power management integrated circuit (PMIC), a charger IC, or a battery or fuel gauge may be included in the power management module 295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specific state of the electronic device 201 or a part thereof (e.g., the processor 210), such as a booting state, a message state, a charging state, and the like. The motor 298 may convert an electrical signal into a mechanical vibration and may generate the following effects: vibration, haptic, and the like. The electronic device 201 may include a processing device (e.g., a GPU) for supporting a mobile TV. The processing device for supporting the mobile TV may process media data according to the standards of digital multimedia broadcasting (DMB), digital video broadcasting (DVB), MediaFLO™, or the like. Each of the above-mentioned elements of the electronic device according to various embodiments of the present disclosure may be configured with one or more components, and the names of the elements may be changed according to the type of the electronic device. In various embodiments, some elements of the electronic device (e.g., the electronic device 201) may be omitted or other additional elements may be added. Furthermore, some of the elements of the electronic device may be combined with each other so as to form one entity, so that the functions of the elements may be performed in the same manner as before the combination.

Figure 3:
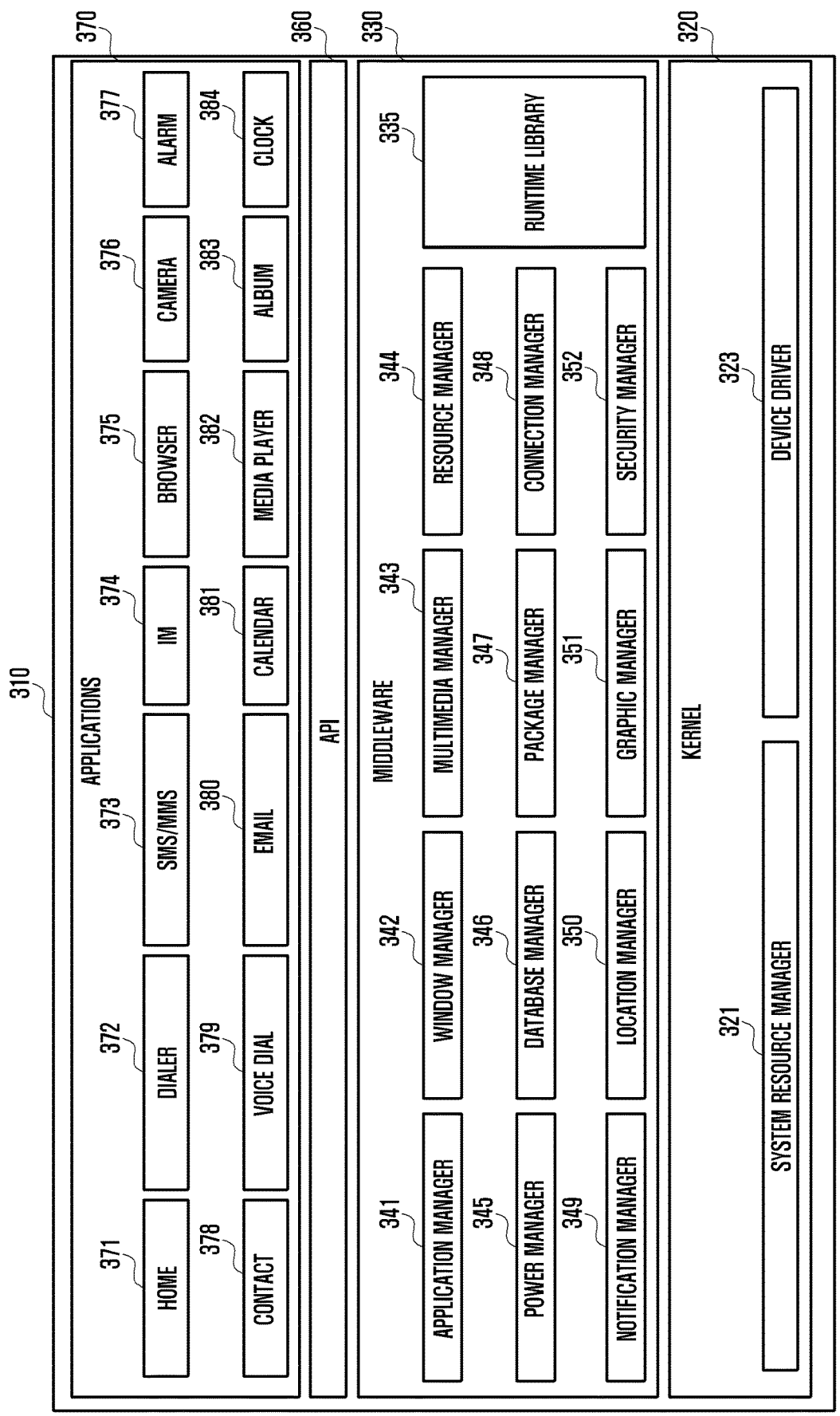
FIG. 3 is a block diagram of a program module according to various embodiments of the present disclosure.

FIG. 3 illustrates a block diagram of a program module, according to various embodiments. According to an embodiment, a program module 310 (e.g., the program 140) may include an operating system (OS) to control resources associated with an electronic device (e.g., the electronic device 101), and/or diverse applications (e.g., the application program 147) driven on the OS. The OS may be, for example, Android™, iOS™, Windows™, Symbian™, Tizen™, or Bada™. The program module 310 may include a kernel 320 (e.g., the kernel 141), a middleware 330 (e.g., the middleware 143), an application programming interface (API) 360 (e.g., the API 145), and/or an application 370 (e.g., the application program 147). At least a portion of the program module 310 may be preloaded on an electronic device or may be downloadable from an external electronic device (e.g., the first electronic device 102, the second electronic device 104, the server 106, or the like).

The kernel 320 (e.g., the kernel 141) may include, for example, a system resource manager 321 or a device driver 323. The system resource manager 321 may control, allocate, or retrieve system resources. According to an embodiment, the system resource manager 321 may include a process managing unit, a memory managing unit, a file system managing unit, or the like. The device driver 323 may include, for example, a display driver, a camera driver, a Bluetooth driver, a shared memory driver, a USB driver, a keypad driver, a Wi-Fi driver, an audio driver, or an interprocess communication (IPC) driver. The middleware 330 may provide, for example, a function that the application 370 needs in common, or may provide diverse functions to the application 370 through the API 360 to allow the application 370 to efficiently use limited system resources of the electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module that is used by a compiler to add a new function through a programming language while the application 370 is being executed. The runtime library 335 may perform input/output management, memory management, or capacities about arithmetic functions. The application manager 341 may manage, for example, a life cycle of at least one application of the application 370. The window manager 342 may manage a graphic user interface (GUI) resource that is used in a screen. The multimedia manager 343 may identify a format necessary for playing diverse media files, and may perform encoding or decoding of media files by using a codec suitable for the format. The resource manager 344 may manage resources such as a memory space or source code of the application 370. The power manager 345 may manage a battery or power, and may provide power information for an operation of an electronic device. According to an embodiment, the power manager 345 may operate with a basic input/output system (BIOS). The database manager 346 may generate, search for, or modify database that is to be used in the application 370. The package manager 347 may install or update an application that is distributed in the form of package file.

The connectivity manager 348 may manage, for example, wireless connection. The notification manager 349 may provide an event, for example, arrival message, appointment, or proximity notification to a user. For example, the location manager 350 may manage location information about an electronic device. The graphic manager 351 may manage a graphic effect that is provided to a user, or manage a user interface relevant thereto. The security manager 352 may provide, for example, system security or user authentication. According to an embodiment, the middleware 330 may include a telephony manager for managing a voice or video call function of the electronic device or a middleware module that combines diverse functions of the above-described elements. According to an embodiment, the middleware 330 may provide a module specialized to each OS kind to provide differentiated functions. Additionally, the middleware 330 may dynamically remove a part of the preexisting elements or may add new elements thereto. The API 360 may be, for example, a set of programming functions and may be provided with a configuration that is variable depending on an OS. For example, in the case where an OS is the android or the iOS, it may provide one API set per platform. In the case where an OS is the tizen, it may provide two or more API sets per platform.

The application 370 may include, for example, applications such as a home 371, a dialer 372, an SMS/MMS 373, an instant message (IM) 374, a browser 375, a camera 376, an alarm 377, a contact 378, a voice dial 379, an e-mail 380, a calendar 381, a media player 382, an album 383, a watch 384, health care (e.g., measuring an exercise quantity, blood sugar, or the like) or offering of environment information (e.g., information of barometric pressure, humidity, temperature, or the like). According to an embodiment, the application 370 may include an information exchanging application to support information exchange between an electronic device and an external electronic device. The information exchanging application may include, for example, a notification relay application for transmitting specific information to an external electronic device, or a device management application for managing the external electronic device. For example, the notification relay application may include a function of transmitting notification information, which arise from other applications, to an external electronic device or may receive, for example, notification information from an external electronic device and provide the notification information to a user. The device management application may install, delete, or update for example, a function (e.g., turn-on/turn-off of an external electronic device itself (or a part of components) or adjustment of brightness (or resolution) of a display) of the external electronic device which communicates with the electronic device, and an application running in the external electronic device. According to an embodiment, the application 370 may include an application (e.g., a health care application of a mobile medical device) that is assigned in accordance with an attribute of an external electronic device. According to an embodiment, the application 370 may include an application that is received from an external electronic device. At least a portion of the program module 310 may be implemented by software, firmware, hardware (e.g., the processor 210), or a combination (e.g., execution) of two or more thereof, and may include modules, programs, routines, sets of instructions, processes, or the like for performing one or more functions.

An electronic device according to various embodiments of the present disclosure may include a display panel, a display controller, memory, and a processor electrically connected to the display panel, the display controller and the memory.

In accordance with one embodiment, the memory may be configured to store instructions enabling the processor to draw an image in response to a periodic synchronization signal, compose the image in response to the synchronization signal after the image drawing, deliver the composed image to the display controller in response to the synchronization signal after the image composition, measure a first standby time until a next synchronization signal is generated after the delivery of the composed image, control the display panel to display an image in response to the generation of the next synchronization signal, determine a first offset value based on the first standby time, and determine image composition timing by applying the first offset value to the periodic synchronization signal.

In accordance with one embodiment, the instructions may enable the processor to determine one of a minimum value of a plurality of measured first standby times or an average value of the plurality of measured first standby times to be the first offset value if the first standby time is measured in plural number.

In accordance with one embodiment, the instructions may enable the processor to measure a second standby time until a next synchronization signal is generated after the image drawing, determine a second offset value based on the second standby time, and determine image drawing timing by applying the second offset value to the periodic synchronization signal.

In accordance with one embodiment, the instructions may enable the processor to determine one of a minimum value of a plurality of measured second standby times or an average value of the plurality of measured second standby times to be the second offset value if the second standby time is measured in plural number.

In accordance with one embodiment, the instructions may enable the processor to adjust the first offset value or the second offset value based on time taken for image drawing or time taken for an image composition.

An electronic device according to various embodiments of the present disclosure may include a display panel, a display controller, memory, and a processor electrically connected to the display panel, the display controller and the memory.

In accordance with one embodiment, the memory may be configured to store instructions enabling the processor to determine an image composition method based on an operating environment of the electronic device, determine an offset value corresponding to the determined image composition method, apply the determined offset value to a periodic synchronization signal, draw an image in response to a synchronization signal to which the offset value has been applied, compose the drawn image in response to the synchronization signal to which the offset value has been applied after the image drawing, deliver the composed image to the display controller after the image composition, and control the display panel to display an image in response to the periodic synchronization signal after the image transmission.

In accordance with one embodiment, the image composition method may include an image composition method through the display controller and an image composition method through a GPU.

In accordance with one embodiment, the operating environment of the electronic device may include the number of applications being executed to draw an image.

Figure 4:
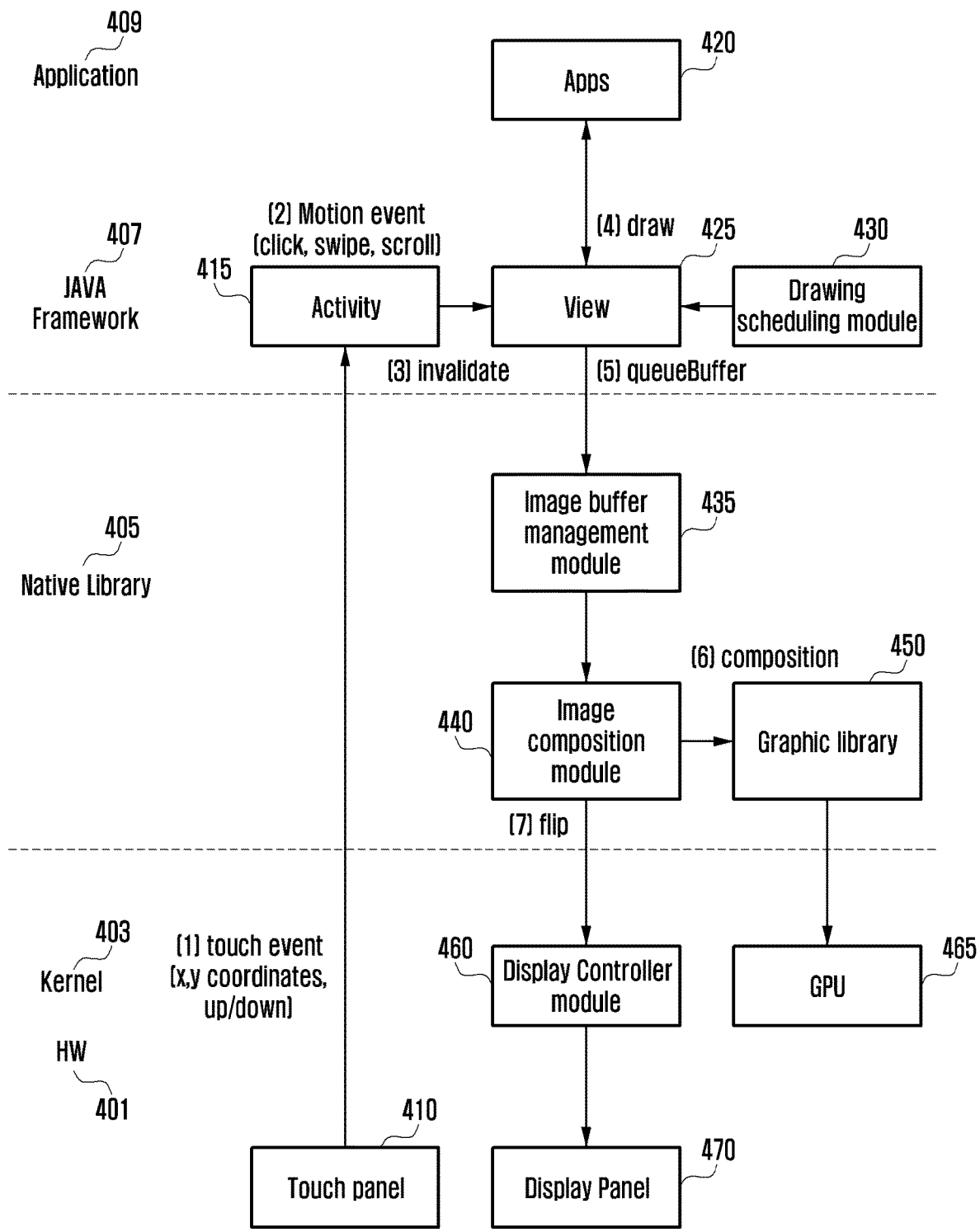
FIG. 4 is a schematic diagram of a logical structure of an electronic device according to various embodiments of the present disclosure.

FIG. 4 is a schematic diagram of a logical structure of an electronic device according to various embodiments of the present disclosure.

In accordance with one embodiment, the electronic device may include a structure of hardware (HW) 401, a kernel 403, a native library 405, a framework 407 (e.g., JAVA framework) and an application 409.

The HW may include a touch panel 410 and a display panel 470, for example. For example, the electronic device may include a touch screen in which the touch panel 410 and the display panel 470 are integrated.

The kernel 403 may control or manage system resources used to execute an operation or function implemented in other programs (e.g., application 420), for example. Furthermore, the kernel 403 may provide an interface capable of controlling or managing system resources by accessing each element of the electronic device in the application 420. For example, the kernel 403 may control or manage the operations of a display controller 460 and a GPU 465 by accessing the display controller 460 or the GPU 465.

The native library layer 405 may include an image buffer management module (e.g., buffer queue) 435, an image composition module (e.g., surface flinger) 440 and a graphic library (e.g., open graphic library (open GL)) 450.

The framework layer 407 may include an activity 415, a view module 425 and a drawing scheduling module (e.g., choreographer) 430.

The application layer 409 may include at least one application 420 performing an operation of the electronic device.

An operation for the electronic device to configure an image to be displayed on the display panel 470 in response to a user input is described. First, the electronic device may receive a touch event (1). For example, the touch panel 410 may receive a touch event from a user. For example, the touch panel 410 may recognize basic touch information, such as touched coordinates and a movement of (e.g., up/down) of the touch, and may transmit it to the activity 415.

The activity 415 may recognize a motion event based on the basic touch information (2). For example, the activity 415 may obtain motion event information into which the user's abstract intent has been incorporated from the basic touch information. For example, the activity 415 may determine whether the received touch event corresponds to which one of various motion events, such as click, swipe and scroll, based on the touch information.

In accordance with various embodiments, the activity 415 may be configured as part of the application 420. In accordance with one embodiment, the activity 415 may manage a screen (e.g., screen or window) of the application 420 or various events of the application 420. In accordance with various embodiments, the activity 415 may have various names (e.g., windows) depending on a framework and operate in various ways depending on the framework.

After determining the motion event, the electronic device may perform an invalidate procedure (3). For example, the activity 415 may update view information to be updated based on the recognized motion event.

When the view information is updated, the electronic device may configure an image in response to a synchronization signal (e.g., vsync signal) provided by the drawing scheduling module 430. For example, the application 420 may draw an image to be displayed on a display based on the updated view information while operating in conjunction with the view module (4). In accordance with one embodiment, the drawing scheduling module may manage timing when an image is drawn based on a change in or input to a screen of the electronic device. The drawing scheduling module may receive a synchronization signal (e.g., Vsync signal) transmitted by an element, such as a display, and may schedule a task for rendering a display frame.

The electronic device may maintain a standby state for an image composition by transmitting the drawn image to the image buffer management module 435 (5). For example, the electronic device may store the drawn image in a separate buffer (e.g., queue buffer) until the drawn image stored in a graphic buffer is composed.

The electronic device may compose a plurality of drawn images (6). For example, the image composition module 440 may be triggered in response to a synchronization signal (e.g., vsync signal) to compose the images. For example, the image composition module 440 may fetch images that wait for a composition from the image buffer management module 435, may compose the images, and may store them in a frame buffer. In accordance with various embodiments, the electronic device may compose images in software or using hardware when composing the images. For example, when the images are composed in software, the electronic device may compose the images using the GPU 465. In this case, the electronic device may use a graphic library (e.g., open GL ES (GLES) library) 450 for control of the GPU 465. When the images are composed using hardware, the electronic device may compose the images using a hardware composer without the help of the GPU 465. For example, when the images are composed using hardware, the electronic device may not include the GPU 465.

After the images are composed, the electronic device may perform a flip operation (7). For example, the electronic device may deliver information of the frame buffer on which a composition has been completed to the display controller 460. The display controller 460 may deliver the pixel data of the frame buffer to the display panel 470 in response to a synchronization signal (e.g., vsync signal). For example, the display controller 460 may fetch the pixel data by direct memory access (DMA), and may deliver the pixel data to the display panel in a packet form. For example, a packet method may be determined based on the protocol of a physically connected interface (e.g., MIPI-DSI, HDMI, eDP). The electronic device displays a configured image on the display panel 470, so the image changed by incorporating the input of a user can be displayed.

Figure 5:
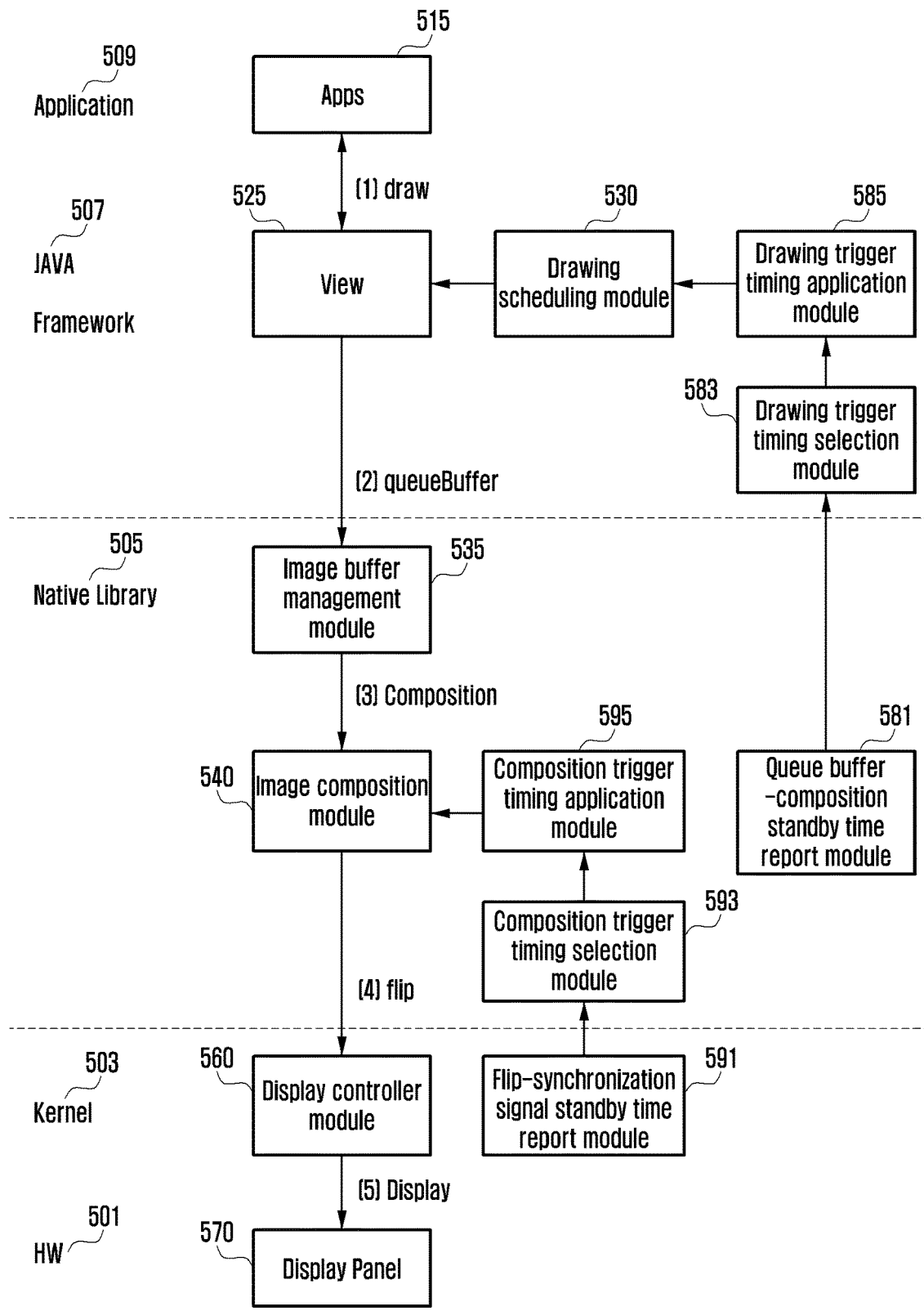
FIG. 5 is a schematic diagram of a logical structure of an electronic device according to various embodiments of the present disclosure.

FIG. 5 is a schematic diagram of a logical structure of an electronic device according to various embodiments of the present disclosure. Hereinafter, an operation and description of the same element as that shown in FIG. 4 are omitted.

In accordance with various embodiments of the present disclosure, the electronic device may include an application 515, a view module 525, a drawing scheduling module (e.g., choreographer) 530, an image buffer management module (e.g., buffer queue) 535, an image composition module (e.g., surface flinger) 540, a display controller 560 and a display panel 570. For example, the electronic device may draw an image in the application 515 and the view module 525 in response to a synchronization signal (vsync) provided by the drawing scheduling module 530, and may deliver the drawn image to the image buffer management module 535. The image composition module 540 may compose the images fetched from the image buffer management module 535 in response to a synchronization signal. The display panel 570 may display an image according to a user input through an operation for the display controller 560 to receive the composed images and to deliver them to the display panel 570.

In accordance with various embodiments, the electronic device may further include a drawing trigger timing selection module 583, a drawing trigger timing application module 585 and a queue buffer-composition standby time measurement module 581. For example, the electronic device may include a module for controlling drawing trigger timing in order to reduce the standby time of a synchronization signal which may occur between image compositions after drawing.

The queue buffer-composition standby time measurement module 581 may measure the standby time of a synchronization signal (e.g., vsync signal) until images are composed in the image composition module 540 after image drawing in the application 515. For example, the queue buffer-composition standby time measurement module 581 may measure the time when the composition of an image drawn from the application 515 is started every period (i.e., every period) after the drawn image is delivered to the image composition module 540 through a queue buffer. The queue buffer-composition standby time measurement module 581 may deliver the measured standby time to the drawing trigger timing selection module 583.

The drawing trigger timing selection module 583 may calculate a first offset value based on the standby time received from the queue buffer-composition standby time measurement module 581. For example, the first offset value may be a time value until drawing starts after a synchronization signal (vsync signal) in the application 515. For example, the drawing trigger timing selection module 583 may sample the data of a standby time. The drawing trigger timing selection module 583 may collect a given amount of standby time data or standby time data for a set time. For example, the drawing trigger timing selection module 583 may determine the first offset value based on the collected data. In accordance with various embodiments, the drawing trigger timing selection module 583 may determine a minimum value of standby times to be the first offset value in order to make a frame drop a minimum. The drawing trigger timing selection module 583 may determine an average value of collected standby times to be the first offset value by considering user responsiveness with priority. For example, a method for the drawing trigger timing selection module 583 to determine the first offset value may be configured in various ways by considering a frame drop rate or priority of user responsiveness.

The drawing trigger timing application module 585 may apply the determined first offset value to the drawing scheduling module 530. For example, the drawing scheduling module 530 may apply the first offset to the existing synchronization signal (vsync) and provide each element (e.g., application 515, view module 525) with a trigger signal (e.g., a synchronization signal to which the first offset has been applied).

Accordingly, the application 515 may draw an image in response to the trigger signal instead of the existing synchronization signal. In accordance with an embodiment of the present disclosure, a standby time occurred prior to an image composition in the image composition module 540 after image drawing in the application 515 can be obviated or reduced by drawing an image in response to the trigger signal to which the first offset value has been applied.

In accordance with various embodiments, the electronic device may further include a flip-synchronization signal standby time measurement module 591, a composition trigger timing selection module 593 and a composition trigger timing application module 595.

The flip-synchronization signal standby time measurement module 591 may measure the standby time of a synchronization signal (e.g., vsync signal) occurring before the display panel 570 displays an image based on data received from the display controller 560 after a flip operation (an operation of delivering a composed image to the display controller 560). For example, the flip-synchronization signal standby time measurement module 591 may measure a standby time until the display controller 560 displays a composed image on the display panel 570 in a next synchronization signal after an image (frame buffer image) composed every period (i.e., every period) is delivered to the display controller 560 through a flip. The flip-synchronization signal standby time measurement module 591 may deliver the measured standby time to the composition trigger timing selection module 593.

The composition trigger timing selection module 593 may calculate a second offset value based on the standby time received from the flip-synchronization signal standby time measurement module 591. For example, the second offset value may be a time value until the image composition module 540 starts the composition of images after a synchronization signal (vsync signal) in the application 515. For example, the composition trigger timing selection module 593 may sample the data of the standby time. The composition trigger timing selection module 593 may collect a given amount of standby time data or standby time data for a set time. For example, the composition trigger timing selection module 593 may determine the second offset value based on the collected data. In accordance with various embodiments, the composition trigger timing selection module 593 may determine a minimum value of standby times to be the second offset value in order to make a frame drop a minimum. The composition trigger timing selection module 593 may determine an average value of collected standby times to be the second offset value by considering user responsiveness with priority. For example, a method for the composition trigger timing selection module 593 to determine the second offset value may be configured in various ways by considering a frame drop rate or priority of user responsiveness.

The composition trigger timing application module 595 may apply the determined second offset to the image composition module 540. The image composition module 540 may start the composition of images at the trigger timing when the second offset has been applied. In accordance with an embodiment of the present disclosure, the image composition module 540 starts the composition of images at the timing when the display standby time of the display controller 560 is a minimum, so a standby time occurred before the display panel 570 displays an image after a flip of the display controller 560 can be obviated or reduced.

In accordance with various embodiments, the drawing trigger timing selection module 583, the drawing trigger timing application module 585 and the queue buffer-composition standby time measurement module 581 may be configured as independent modules or may be configured as a single integrated module. In accordance with various embodiments, the flip-synchronization signal standby time measurement module 591, the composition trigger timing selection module 593 and the composition trigger timing application module 595 may be configured as independent modules or may be configured as a single integrated module. Furthermore, In accordance with various embodiments, the electronic device may include all modules for controlling drawing trigger timing (drawing trigger timing selection module 583, drawing trigger timing application module 585 and queue buffer-composition standby time measurement module 581) and modules for adjusting composition trigger timing (flip-synchronization signal standby time measurement module 591, composition trigger timing selection module 593 and composition trigger timing application module 595), and may include only one of the modules for controlling drawing trigger timing or the modules for adjusting composition trigger timing.

In accordance with various embodiments, the electronic device may identify whether a problem has occurred in image drawing or image composition timing based on a first standby time and a second standby time. For example, a dynamic voltage and frequency scaling (DVFS) may occur in the electronic device depending on an operating condition (e.g., lock mode or power-save mode). For example, when a voltage and a clock of a processor (e.g., CPU) are lowered due to DVFS, an image drawing time may be delayed, so an image composition time may also be delayed. The electronic device may identify whether a problem has occurred in image drawing and image composition timing based on a first standby time and a second standby time. For example, the electronic device may identify whether image drawing has been well performed prior to an image composition after image drawing. In accordance with one embodiment, when a problem occurred in image drawing or image composition timing, the electronic device may recover setting to a reset state by resetting a determined offset value. For example, when a problem occurs, the electronic device may dynamically control image drawing and image composition timing by resetting an offset value (e.g., first offset value or second offset value) to 0.

In accordance with various embodiments of the present disclosure, a standby time when an image is configured can be reduced and responsiveness according to a user input can be improved by dynamically removing drawing trigger timing or composition trigger timing.

Figure 6:
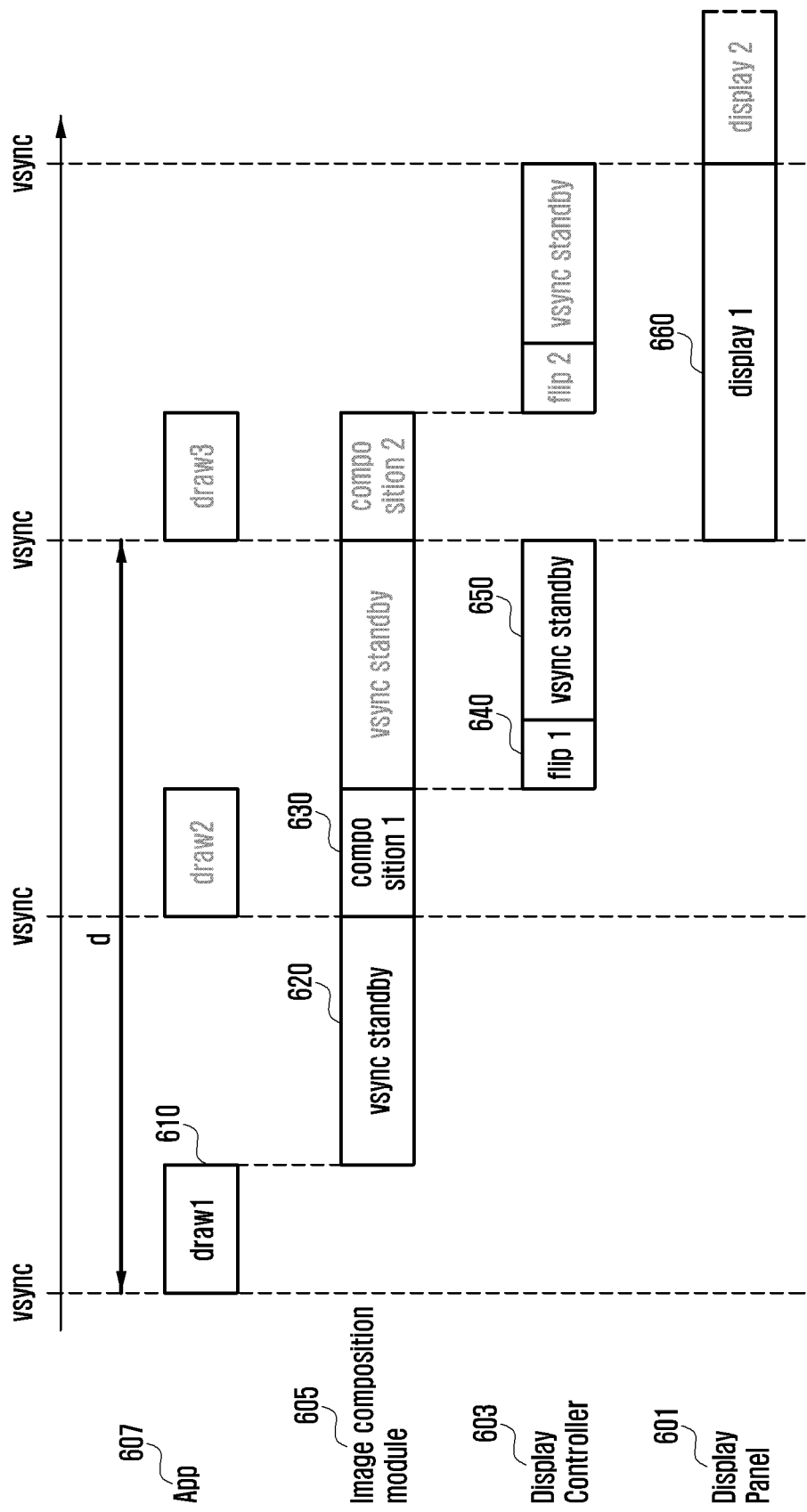
FIG. 6 is a diagram for illustrating a method of configuring and displaying an image in response to a user input in a conventional electronic device.

FIG. 6 is a diagram for illustrating a method of configuring and displaying an image in response to a user input in a conventional electronic device.

The electronic device may include an application 607, an image composition module (e.g., surface flinger) 605, a display controller 603 and a display panel 601. In order to display an image on the display panel 601, a step for the electronic device to perform operations for the application 607 to draw an image, for the image composition module 605 to compose the images drawn by the application 607, for the display controller 603 to receive the composed image and to deliver it to the display panel 601, and for the display panel 601 to display the image is performed.

The operations in the application 607, the image composition module 605, the display controller 603 and the display panel 601 may be associated in response to a synchronization signal (e.g., vsync signal). For example, when the application 607 draws an image in response to a first synchronization signal (610), the image composition module 605 may compose images in response to a next-time (second) synchronization signal (630) and deliver a composed image to the display controller 603. The display controller 603 may deliver (e.g., flip (640)) the composed image to the display panel 601. Thereafter, the display panel 601 may display the image in response to a next-time (third) synchronization signal (660). In this case, the image composition module 605 does not directly compose images drawn by the application 607, but composes the images in response to a synchronization signal of a next sequence, so a standby time 620 for the synchronization signal may occur. Furthermore, when the display controller 603 delivers an image to the display panel 601, a standby time 650 for the synchronization signal may occur. Accordingly, the unnecessary standby times 620 and 650 may occur until a screen switches (i.e., a new image is displayed on the display panel 601) after a user input is received. For example, the electronic device may have a latency time (d) until an image is displayed on the display panel 601 from image drawing (draw). For example, the latency time (d) may be taken until the electronic device draws an image, composes the images, and delivers a composed image to the display panel 601. That is, as the latency time (d) from image drawing to image display increases, user responsiveness may be reduced and screen switching for display on a display may be delayed. For example, in a conventional technology, time corresponding to a period of two cycles or more (i.e., occurrence of two or more synchronization signals (vsync)) is taken until a screen switches (i.e., a new image is displayed) in response to a user input due to the standby times 620 and 650 occurring during an operation.

Figure 7:
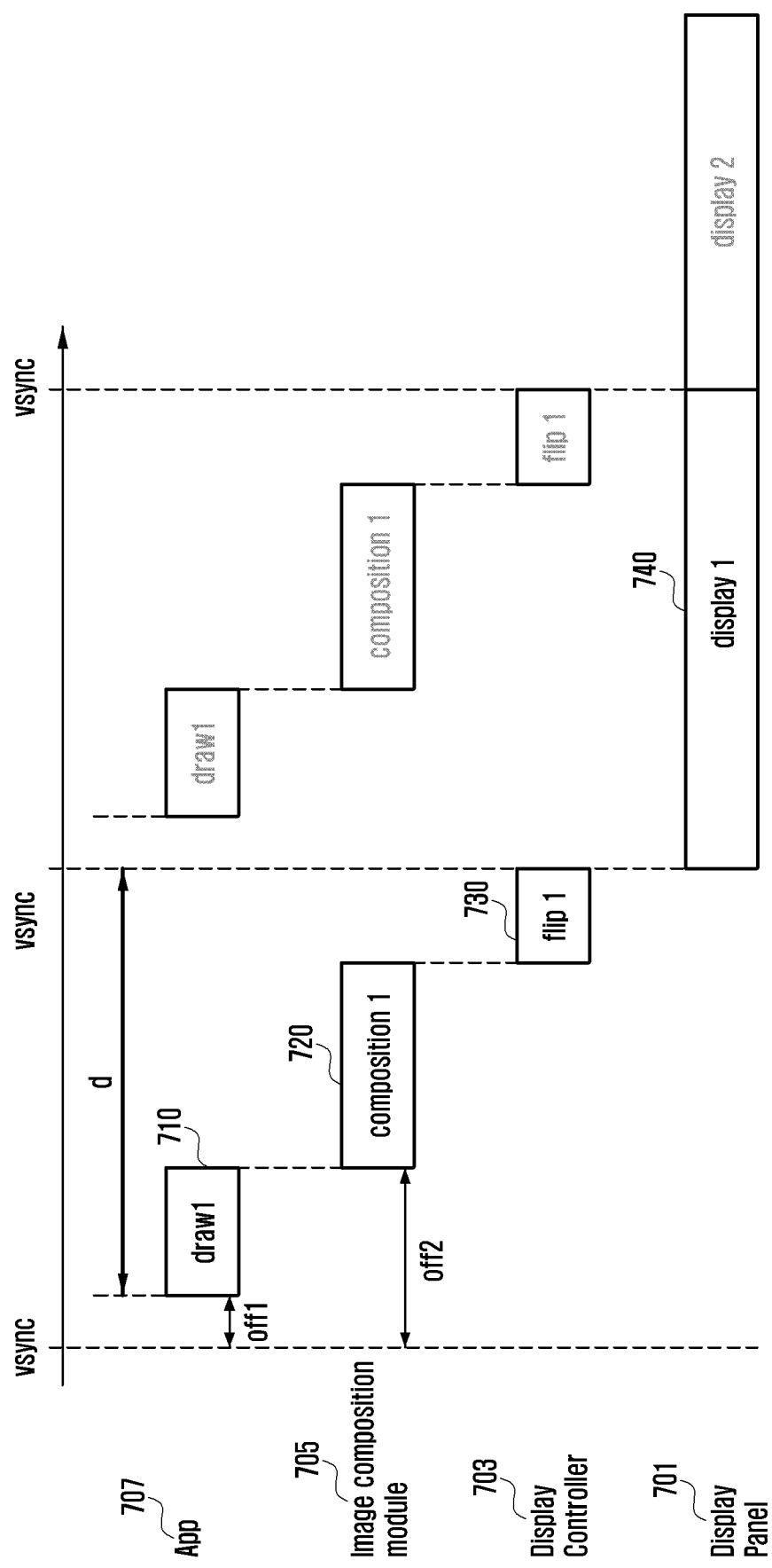
FIG. 7 is a diagram for illustrating an operation of an electronic device according to various embodiments of the present disclosure.

FIG. 7 is a diagram for illustrating an operation of an electronic device according to various embodiments of the present disclosure.

In accordance with various embodiments, the electronic device may include an application 707, an image composition module (e.g., surface flinger) 705, a display controller 703 and a display panel 701. In order to display an image on the display panel 701, the electronic device may perform an operation for the application 707 to draw an image, for the image composition module 705 to compose the images drawn by the application 707, for the display controller 703 to receive the composed image and to deliver it to the display panel 701, and for the display panel 701 to display the image.

In accordance with one embodiment, the electronic device may measure a standby time until the image composition module 705 composes images after image drawing in the application 707. For example, when the electronic device performs each operation in response to a synchronization signal (vsync signal), a standby time may occur until the image composition module 705 composes images in response to a second synchronization signal after the application 707 draws the images in response to a first synchronization signal. The electronic device may measure a standby time until an image composition start after drawing at a set time interval or by a set number.

In accordance with one embodiment, the electronic device may determine a first offset value (off 1) based on a standby time until an image composition start after measured drawing. For example, the first offset value (off 1) may be a value of a set time interval until the application 707 starts drawing from a synchronization signal. In accordance with various embodiments, the electronic device may determine a minimum value of measured standby times to be the first offset value (off 1). For example, an image drawing time in the application 707 is not an always fixed value, but may be changed. If a minimum value of measured standby times is determined to be the first offset value (off 1), a frame drop attributable to the shortage of a drawing time can be prevented because an image drawing time can be sufficiently considered. In accordance with various embodiments, the electronic device may determine an average value of measured standby times to be the first offset value (off 1) if user responsiveness is preferentially considered. In this case, the electronic device can further improve user responsiveness for screen display or switching according to a user input because it can further reduce a standby time.

For example, the electronic device may start image drawing from the lapse time of a first offset from a synchronization signal (vsync signal) by applying the first offset. In this case, a standby time after the drawing can be reduced, and the image composition module 705 may compose images. That is, the electronic device shifts the phases of image processing operations by applying the first offset, thus being capable of obviating an unnecessary standby time and reducing an image switching time in a display.

In accordance with one embodiment, the electronic device may measure a standby time until the display panel 701 displays an image based on data received from the display controller 703 after a flip operation (operation of delivering a composed image to the display controller 703).

In accordance with one embodiment, the electronic device may determine a second offset value (off 2) based on a standby time until the display panel 701 displays an image after a flip. For example, the second offset value (off 2) may be a value of a set time interval until the image composition module 705 starts an image composition from a synchronization signal.

In accordance with various embodiments, the electronic device may determine a minimum value of standby times to the second offset value (off 2) until the display panel 701 displays an image after a measured flip. If a minimum value of measured standby times is determined to be the second offset value (off 2), a frame drop attributable to the shortage of an image composition time can be prevented because an image composition time can be sufficiently considered. In accordance with various embodiments, if user responsiveness is preferentially considered, the electronic device may determine an average value of measured standby times to be the second offset value (off 2). In this case, the electronic device can further improve user responsiveness for screen display or switching according to a user input because it can further reduce a standby time.

For example, the electronic device may start the composition of images after a lapse of the second offset from a synchronization signal (vsync signal) by applying the second offset. In this case, the electronic device can reduce a standby time after the image composition and can immediately deliver a composed image to the display controller 703. That is, the electronic device shifts the phases of image processing operations by applying the second offset, thus being capable of obviating an unnecessary standby time and reduce an image switching time in a display.

In accordance with various embodiments, the electronic device may apply the first offset value (off 1) or the second offset value (off 2) selectively or together.

In accordance with various embodiments, the time (d) taken from the image drawing (draw 1) of the electronic device to image display (display 1) can be reduced by applying the first offset value (off 1) or the second offset value (off 2). The electronic device according to various embodiments of the present disclosure can process (draw and compose) an image within a single synchronization signal (vsync) period and display the image on the display panel 701 by applying the offset value (off 1 or off 2).

Figure 8:
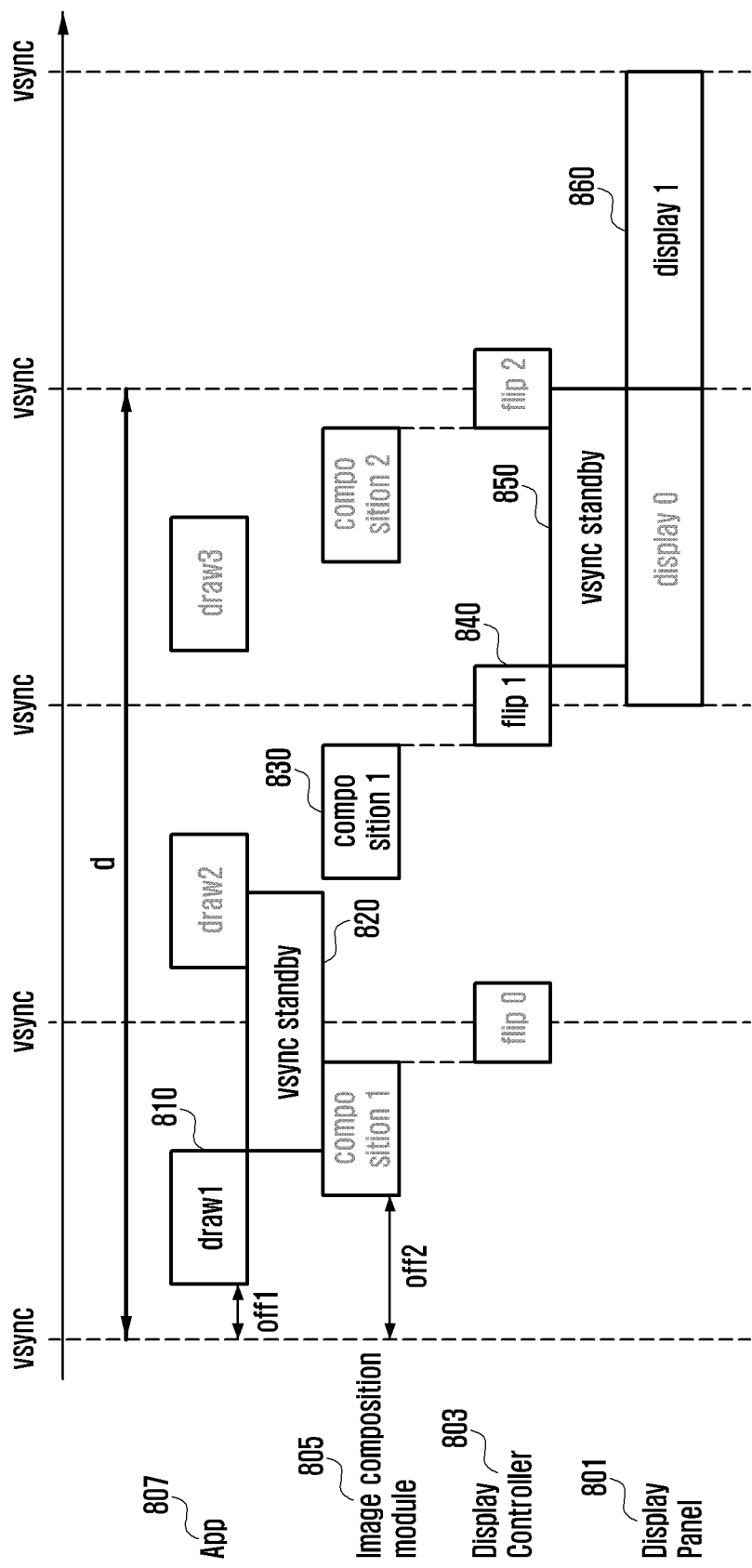
FIG. 8 is a diagram for illustrating an operation of an electronic device according to various embodiments of the present disclosure.

FIG. 8 is a diagram for illustrating an operation of an electronic device according to various embodiments of the present disclosure. FIG. 8 shows a case where the electronic device applies a fixed first offset and a second offset value (off 2) according to one embodiment. Hereinafter, a redundant operation and description compared to FIG. 7 are omitted.

In accordance with one embodiment, the electronic device may measure a standby time until an image composition module (e.g., surface flinger) 805 composes images after image drawing in an application 807. In accordance with one embodiment, the electronic device may determine a first offset value (off 1) based on a standby time until an image composition start after measured drawing.

In accordance with one embodiment, the electronic device may measure a standby time until the display panel 801 displays an image based on data received from the display controller 803 after a flip operation (operation of delivering a composed image to a display controller 803). In accordance with one embodiment, the electronic device may determine a second offset value (off 2) based on a standby time until a display panel 801 displays an image after a flip.

Referring to FIG. 8, if the electronic device maintains the first offset value (off 1) and the second offset value (off 2) to fixed values, an image composition time in the image composition module 805 may be reached before a drawing operation in the application 807 is completed. In this case, the electronic device does not immediately perform an image composition because there is no image to be composed, and a frame drop may occur because an image composition is performed in a next period. For example, the time taken for a drawing operation in the application 807 is always not the same, but may have a slight difference. Accordingly, if the electronic device maintains a fixed first offset value (off 1) and a fixed second offset value (off 2), there is a possibility that image display and switching may be delayed in some cycles. For example, when a frame drop occurs, a time (d) taken for the electronic device to display an image on the display panel 801 from image drawing may be increased. However, as shown in FIG. 7, when a frame drop does not occur, the time taken to display an image on the display panel 801 from image drawing can be reduced by applying an offset value. Accordingly, in accordance with various embodiments of the present disclosure, the electronic device can prevent a frame drop and minimize the time taken for image processing by adaptively associating and determining the first offset value (off 1) and the second offset value (off 2).

In accordance with various embodiments, the electronic device may determine the first offset value (off 1) and the second offset value (off 2) by associating them. For example, the electronic device may determine the first offset value (off 1) by considering the first offset value (off 1) and a drawing time in the application 807. For example, if the second offset value (off 2) is set too small and thus images are to be composed before drawing is completed, a frame drop may occur because the images to be composed have not been prepared. In order to prevent a frame drop, the electronic device may determine the first offset value (off 1) or the second offset value (off 2) by generally considering the drawing time of the application 807 and an image composition time. In accordance with various embodiments, the electronic device may adaptively determine or change the first offset value (off 1) and the second offset value (off 2) by considering a drawing time and an image composition time. In accordance with one embodiment of the present disclosure, a standby time occurring between a dynamically changed image drawing time and a dynamically changed image composition time or operation may be measured. The first offset value (off 1) and the second offset value (off 2) may be adaptively set or changed according to circumstances by incorporating the measured standby time. In accordance with one embodiment of the present disclosure, by adaptively setting and changing the first offset value (off 1) and the second offset value (off 2), an image display time according to a user input can be reduced, responsiveness can be improved, and a frame drop that may occur due to a calculation error of an offset value can be minimized.

Figure 9:
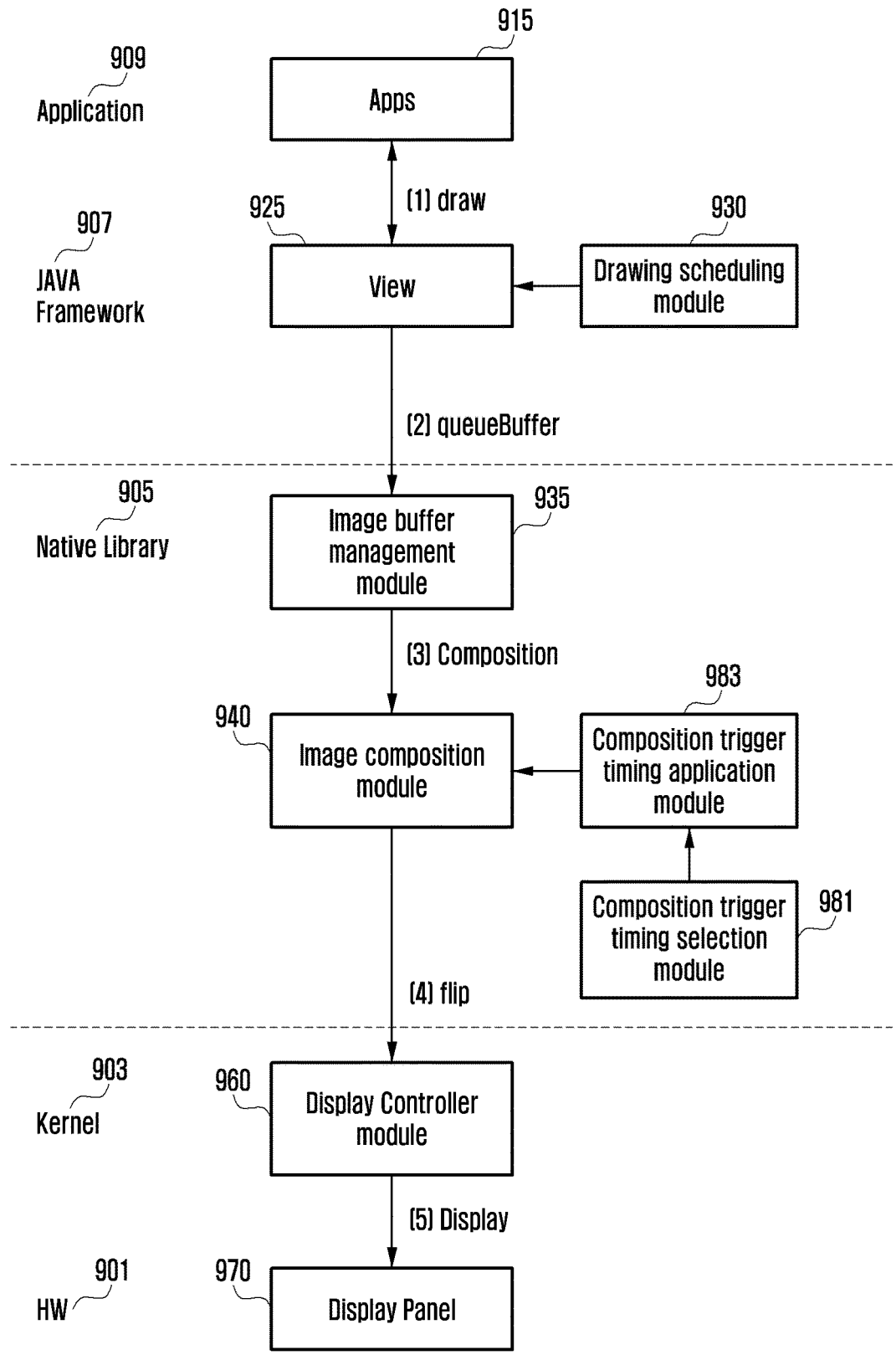
FIG. 9 is a schematic diagram of a logical structure of an electronic device according to various embodiments of the present disclosure.

FIG. 9 is a schematic diagram of a logical structure of an electronic device according to various embodiments of the present disclosure.

In accordance with various embodiments of the present disclosure, the electronic device may include an application 915, a view module 925, a drawing scheduling module (e.g., choreographer) 930, an image buffer management module (e.g., buffer queue) 935, an image composition module (e.g., surface flinger) 940, a display controller 960 and a display panel 970. For example, in the electronic device, the display panel 970 may display an image according to a user input through operations for the application 915 and the view module 925 to draw an image in response to a synchronization signal (vsync) provided by the drawing scheduling module 930 and to deliver the drawn image to the image buffer management module 935, for the image composition module 940 to compose images fetched from the image buffer management module 935 in response to the synchronization signal, and for the display controller 960 to receive the composed images and to deliver them to the display panel 970.

In accordance with various embodiments, the electronic device may further include a composition trigger timing selection module 981 and a composition trigger timing application module 983.

The composition trigger timing selection module 981 may identify an image composition method. For example, the image composition module 940 may determine a composition method of images by considering the execution environment (e.g., the number of applications 915 being executed, an image format, and an image processing operation (e.g., whether image rotation or scaling processing has been performed)) of the electronic device. For example, the image composition method may include a method using hardware and a method using software. For example, if a hardware composer is used, the electronic device may compose images in response to control and operation of the display controller 960. For example, if a GPU is used, the electronic device may compose images using a graphic library (e.g., open GL ES library) under the control of the GPU. For example, the time required may be generally constant depending on an image composition method. For example, a hardware composer (HWC) method may have a shorter time taken for an image composition compared to a graphic library embedded system (GLES) method on average. In accordance with one embodiment, the electronic device (e.g., composition trigger timing selection module 981) may measure each required time according to each image composition method. The electronic device may determine an offset value according to each composition method based on time taken for the composition method. For example, the electronic device may determine the offset value of each image composition method by considering an average image composition time according to each composition method. In accordance with one embodiment, an offset value according to an image composition method may have been previously set.

In accordance with one embodiment, the composition trigger timing selection module 981 may identify an image composition method selected by the image composition module 940, and may determine an offset value based on the selected image composition method. For example, the composition trigger timing selection module 981 may obtain information on a composition method from the image composition module 940. The composition trigger timing selection module 981 may determine an offset value to be applied in a current image processing cycle based on the obtained information on a composition method.

The composition trigger timing application module 983 may control timing when the image composition module 940 starts the composition of images by applying the determined offset value to a synchronization signal (e.g., vsync signal).

In accordance with various embodiments, the composition trigger timing selection module 981 and the composition trigger timing application module 983 may be configured as independent modules or may be configured as a single integrated module.

For example, the time when the application 915 draws an image may be slightly variable depending on the application 915 and the image. However, the time taken to compose images may be maintained generally identically depending on an image composition method. In accordance with various embodiments of the present disclosure, responsiveness of image processing (e.g., image display and change) according to a user input can be easily improved because image composition timing is controlled by identifying an image composition method and applying a variable offset value depending on the image composition method in an image processing cycle.

Figure 10:
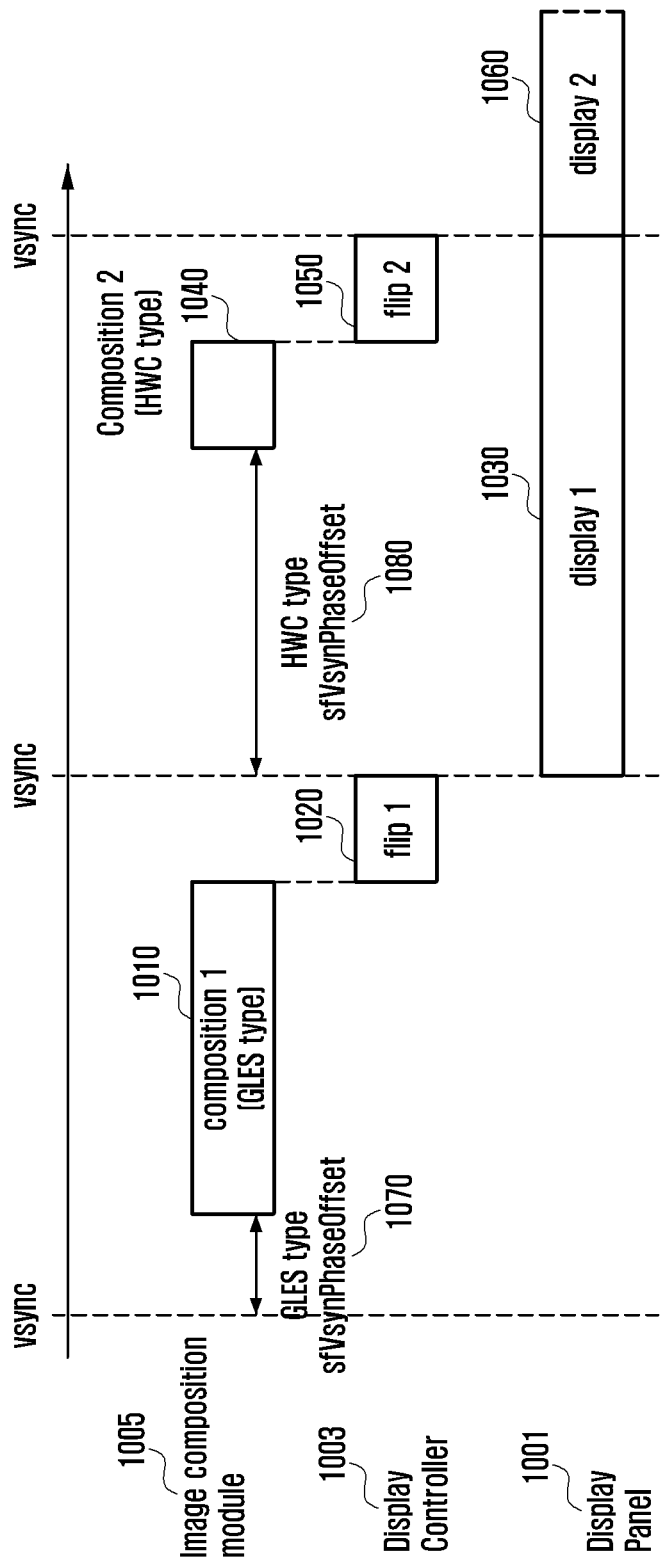
FIG. 10 is a diagram for illustrating an operation of an electronic device according to various embodiments of the present disclosure.

FIG. 10 is a diagram for illustrating an operation of an electronic device according to various embodiments of the present disclosure. For example, FIG. 10 shows an operation of a case where an image is processed according to the embodiment shown in FIG. 9.

In accordance with one embodiment, an image composition module (e.g., surface flinger) 1005 may determine an image composition method based on an execution environment of the electronic device. When the image composition module 1005 determines to compose images using a GLES method in a first period, the electronic device may start the composition of the images by applying a first offset value 1070 corresponding to the GLES method in response to a synchronization signal. The electronic device may compose the images based on the set first offset value 1070, and performs a flip operation. Accordingly, a display panel 1001 may display an image in response to a second period start (second vsync signal). Thereafter, when the image composition module 1005 determines to compose images based on an HWC method in the second period, the electronic device may start the composition of the images by applying a second offset value 1080 corresponding to the HWC method in response to a synchronization signal. That is, the electronic device may control image composition timing by applying the second offset value 1080 greater than the first offset value 1070 because the time taken for an image composition in the HWC method is shorter than that in the GLES method. Accordingly, when the image composition in the second period is completed, a flip operation is performed, and the display panel 1001 may display an image in response to a subsequent third period start (third vsync signal). In accordance with various embodiments of the present disclosure, the electronic device can reduce an unnecessary standby time and improve responsiveness according to a user input by adaptively applying an offset value based on an image composition method in each period.

Figure 11:
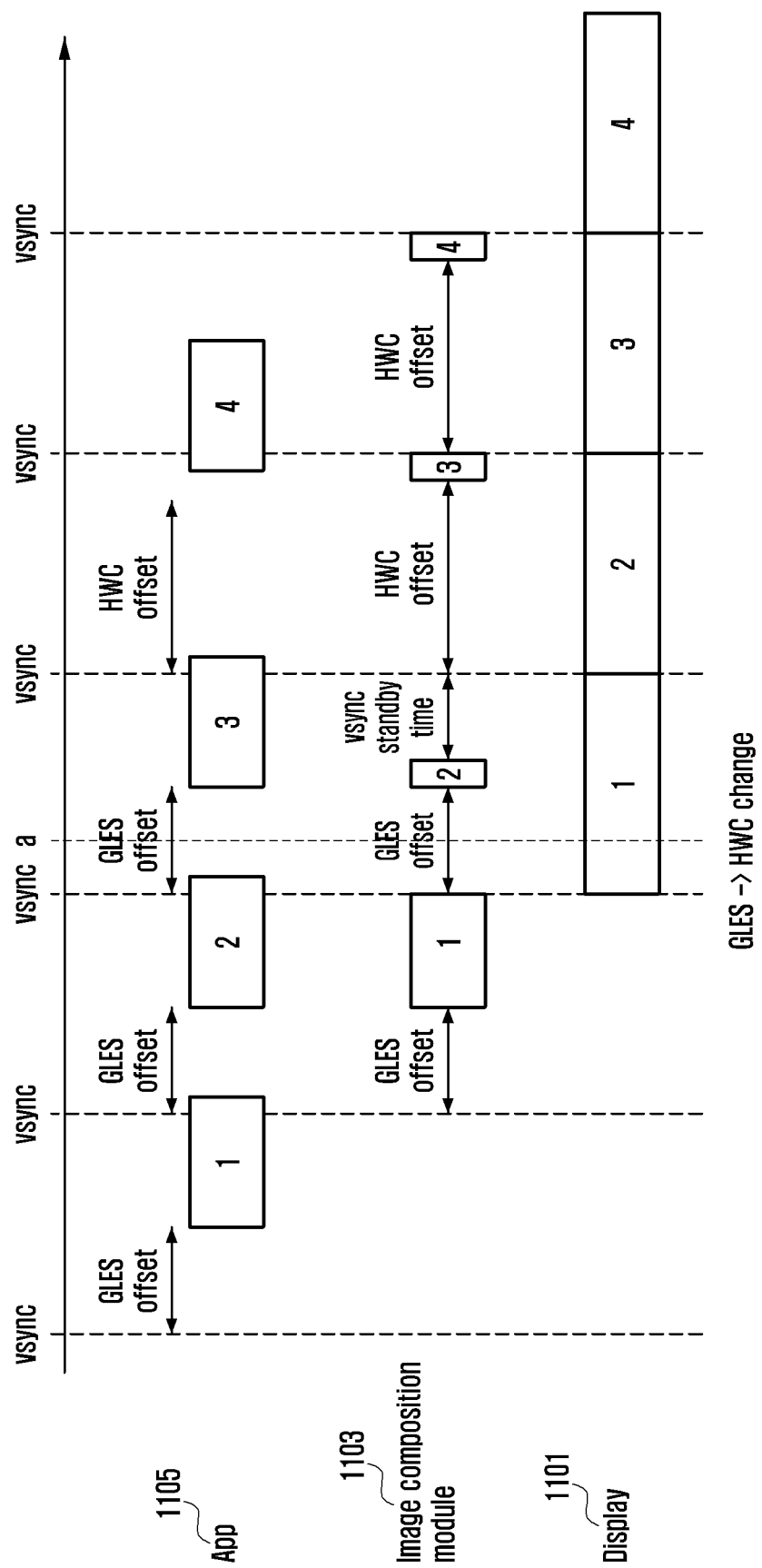
FIG. 11 is a diagram for illustrating an operation of an electronic device according to various embodiments of the present disclosure.

FIG. 11 is a diagram for illustrating an operation of an electronic device according to various embodiments of the present disclosure. For example, FIG. 11 shows an operation of a case where an image composition method changes from the GLES method to the HWC method according to the embodiment of FIG. 9.

In accordance with various embodiments, the electronic device may change an image composition method depending on the operating environment of the electronic device. For example, the image composition module (e.g., surface flinger) 1005 may determine an image composition method depending on the execution environment of the electronic device. For example, FIG. 11 shows a case where an image composition method changes from the GLES method to the HWC method at a point "a."

In general, the GLES method has a longer time taken for an image composition than the HWC method. Accordingly, the electronic device may determine an offset value according to the GLES method to be shorter than an offset value according to the HWC method.

For example, the time taken for an image composition may be reduced because the image composition method has changed to the HWC method based on the point "a." Accordingly, a standby time is formed until a next synchronization signal (vsync signal) is present. Thereafter, the electronic device changes an offset value based on the image processing method (i.e., the changed HWC method), so image composition start timing may be changed. In accordance with one embodiment, since the electronic device adaptively changes and applies an offset value, only one synchronization signal standby time occurs, and screen display on a display 1101 can be consecutively performed without the occurrence of an additional latency time.

Figure 12A:
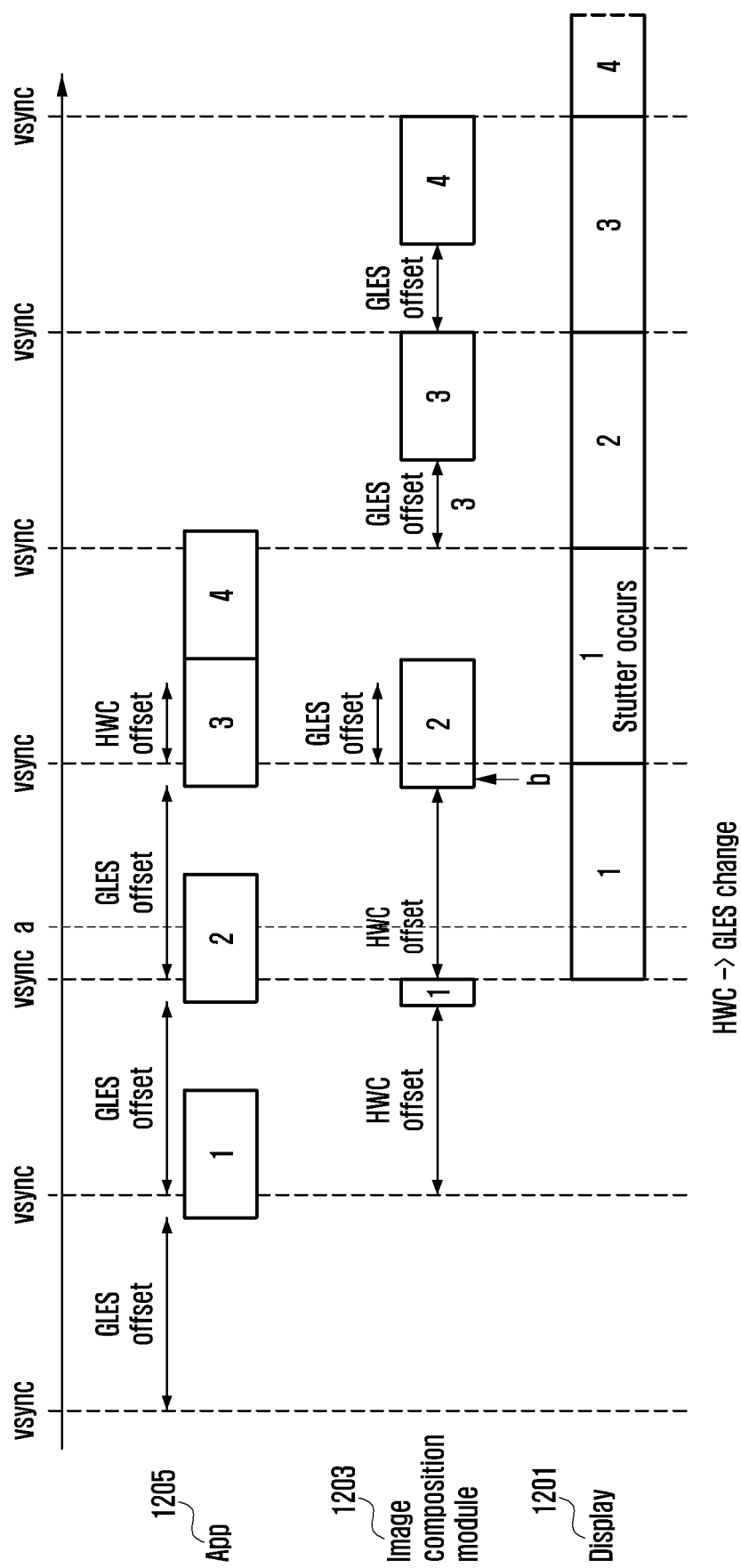
FIGS. 12A and 12B are diagrams for illustrating operations of electronic devices according to various embodiments of the present disclosure.
Figure 12B:
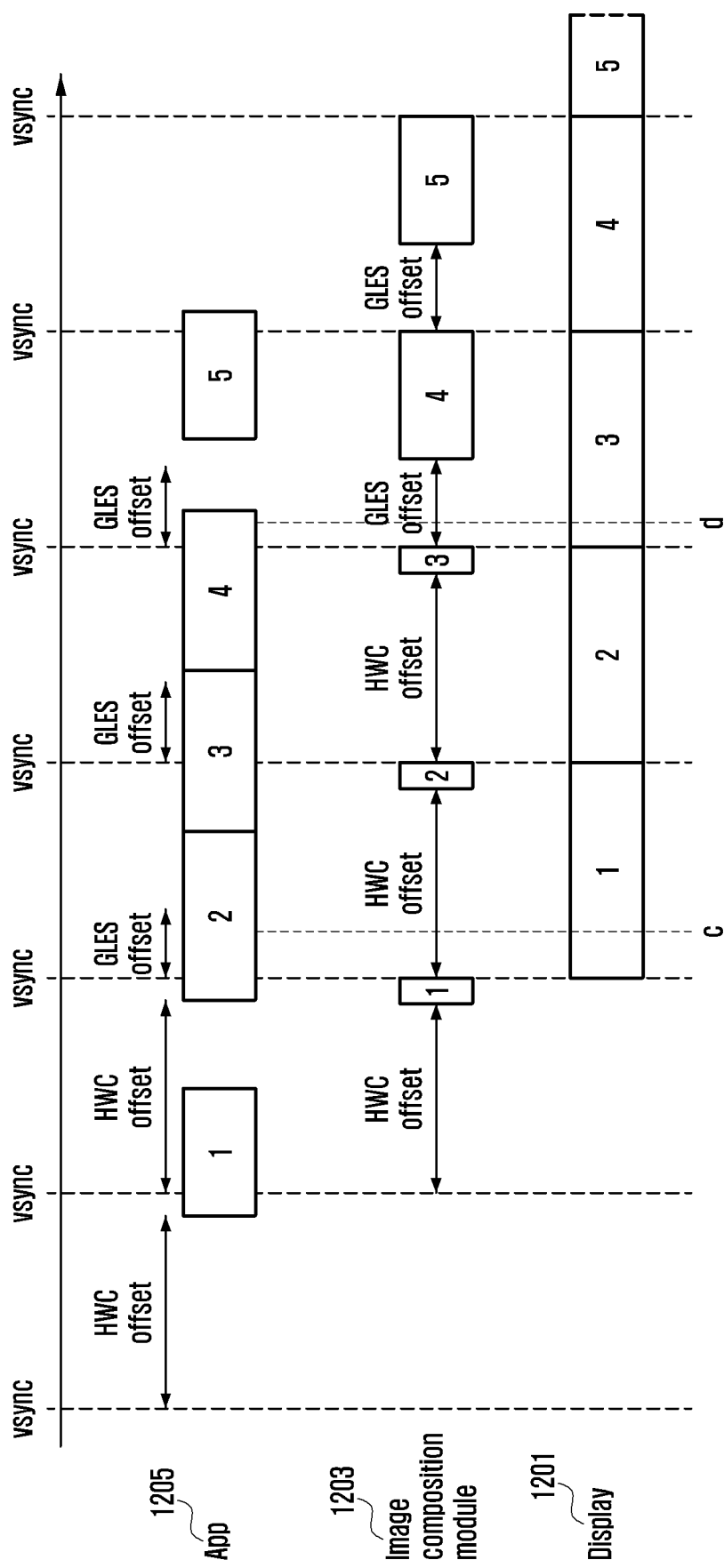

FIGS. 12A and 12B are diagrams for illustrating operations of electronic devices according to various embodiments of the present disclosure.

In accordance with various embodiments, the electronic device may change an image composition method depending on the operating environment of the electronic device. For example, an image composition module (e.g., surface flinger) 1005 may determine an image composition method depending on the execution environment of the electronic device. For example, FIGS. 12A and 12B show operations of a case where an image composition method changes from the HWC method to the GLES method according to the embodiment shown in FIG. 9.

FIG. 12A shows a case where a change in the image composition method is identified at the image composition timing of a corresponding period. In general, the GLES method has a longer time taken for an image composition than the HWC method. Accordingly, the electronic device may determine an offset value according to the GLES method to be shorter than an offset value according to the HWC method. That is, if an image composition method changes from the HWC method to the GLES method at a point "a" and the electronic device identifies such a change at a point "b", that is, image composition timing, and changes an offset value, an increased image composition time may not be incorporated. In this case, since the time for composing a third image is not secured, a stutter phenomenon in which a display 1201 redundantly displays a first image may occur. That is, a phenomenon in which a screen displayed on the display 1201 stops suddenly for a moment may occur.

FIG. 12B shows a case where a change in the image composition method is previously identified prior to the image composition timing of a corresponding period. For example, the electronic device may identify a change in the image composition method before the image composition module 1203 composes an image of a corresponding period, and may previously change an offset value. For example, when a new application 1205 is executed, the electronic device may fetch a method of create layer of an image composition module 1203, and may previously deliver information, such as the width, height and pixel format of an image to be drawn by the corresponding application 1205, to the image composition module 1203. The image composition module 1203 may previously determine or decide an image composition method based on the received information. In accordance with one embodiment, when the image composition module 1203 previously determines or decides an image composition method, the electronic device may set or change an offset value by immediately incorporating the determined image composition method.

In FIG. 12B, when the new application 1205 is executed at a point "c", the electronic device may determine to change an image composition method from the HWC method to the GLES method. In this case, the application 1205 may apply an offset according to the GLES method from a case where a No. 3 image (No. 3 frame) is drawn. In this case, after the application 1205 waits until the drawing of a No. 2 image (No. 2 frame) is terminated, it may start the drawing of the No. 3 image. In accordance with one embodiment, since the drawing of the No. 3 image has been delayed, the electronic device (e.g., image composition module 1203) may apply an offset according to the HWC method up to the composition of the No. 3 image. Thereafter, the electronic device may apply an offset corresponding to the GLES method from a No. 4 image composition. In accordance with one embodiment of the present disclosure, responsiveness upon image processing can be improved without the occurrence of a pause phenomenon (e.g., stutter phenomenon) in a display 1201 because an image composition method changed depending on a change in the environment of an electronic device is identified prior to the composition timing of a corresponding image and an offset value is adaptively set or changed by incorporating the identified image composition method.

Figure 13:
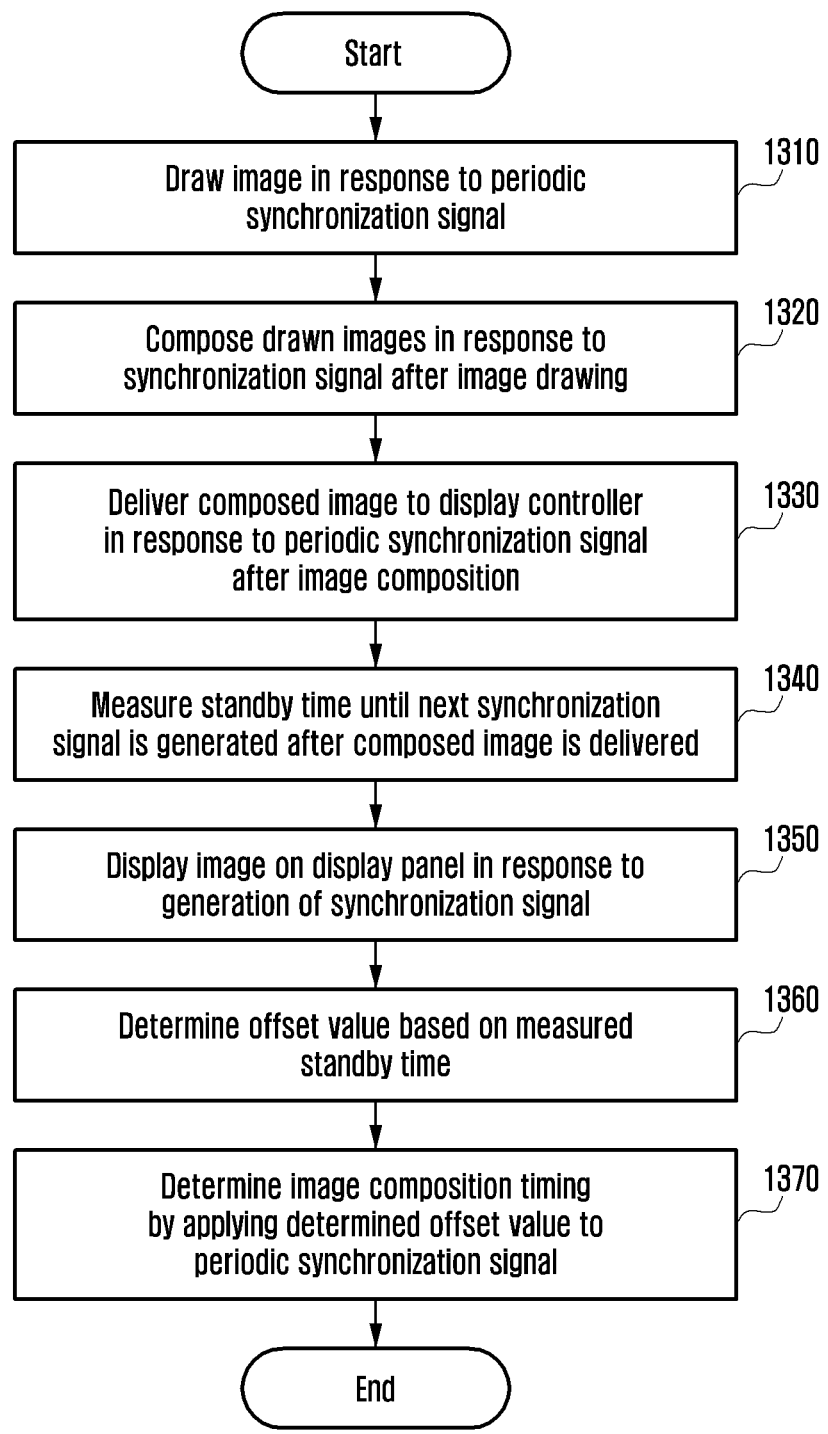
FIG. 13 is a flowchart of a method of controlling an operation of an electronic device according to various embodiments of the present disclosure.

FIG. 13 is a flowchart of a method of controlling an operation of an electronic device according to various embodiments of the present disclosure.

At operation 1310, the electronic device may draw an image in response to a periodic synchronization signal (e.g., vsync signal). For example, the electronic device may draw each image in at least one application.

At operation 1320, the electronic device may compose the drawn images in response to a synchronization signal after the drawing. For example, the electronic device may compose at least one image drawn by a plurality of applications. For example, the electronic device may compose images through an image composition module (surface flinger).

At operation 1330, the electronic device may deliver the composed image to a display controller in response to a periodic synchronization signal. For example, the electronic device may perform a flip operation of delivering the composed image to the display controller.

At operation 1340, the electronic device may measure a standby time until a next synchronization signal is generated after the composed image is delivered. For example, the electronic device may measure a standby time until an image is displayed on a display panel in response to a next synchronization signal after a flip.

At operation 1350, the electronic device may display an image on the display panel in response to the generation of the synchronization signal.

At operation 1360, the electronic device may determine an offset value based on the measured standby time. For example, the electronic device may determine the offset value corresponding to a standby time occurring until an image is displayed on the display panel after the image composition and the flip operation.

In accordance with one embodiment, if a standby time is measured in plural number, the electronic device may determine one of a minimum value of the plurality of measured standby times or an average value of the plurality of measured first standby times to be an offset value. For example, the electronic device may determine an average value or minimum value of standby times to be an offset value based on priority set with respect to the stability or response speed of a display. In accordance with various embodiments, a method for the electronic device to determine an offset value is not limited thereto and may be configured in various ways.

At operation 1370, the electronic device may determine image composition timing by applying the determined offset value to a periodic synchronization signal. For example, the electronic device may start an image composition after time corresponding to the determined offset value from the generation of the synchronization signal.

In accordance with various embodiments, the electronic device determines image drawing timing by considering a standby time (standby time for a wait for a synchronization signal (vsync) of a next period after image drawing) until a composition after image drawing. Accordingly, responsiveness for screen display and switching according to a user input can be improved because an image composition is immediately performed without a standby time after image drawing.

Figure 14:
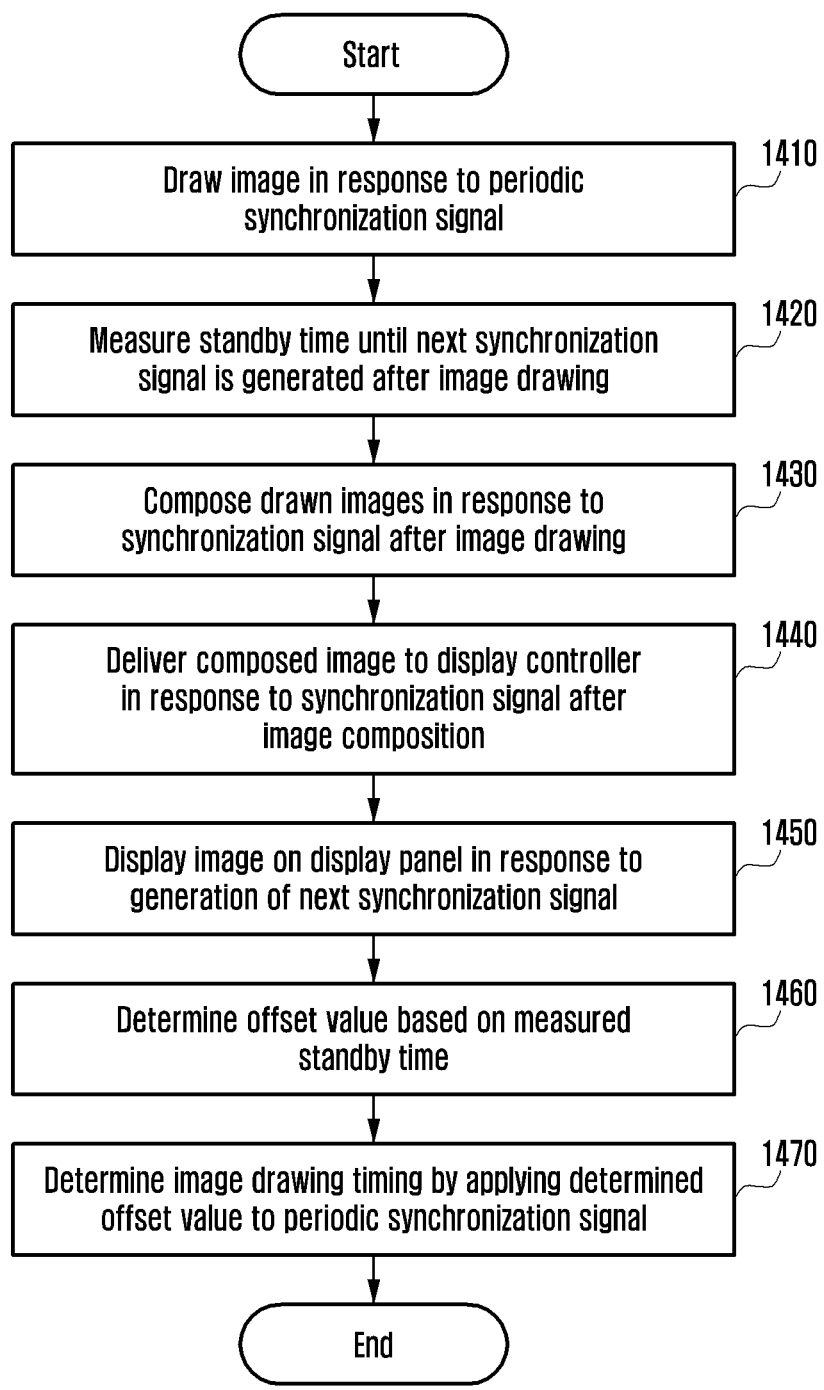
FIG. 14 is a flowchart of a method of controlling an operation of an electronic device according to various embodiments of the present disclosure.

FIG. 14 is a flowchart of a method of controlling an operation of an electronic device according to various embodiments of the present disclosure.

At operation 1410, the electronic device may draw an image in response to a periodic synchronization signal (e.g., vsync signal).

At operation 1420, the electronic device may measure a standby time until a synchronization signal of a next period is generated after the drawing. For example, when the electronic device starts drawing in response to a synchronization signal of a first period at operation 1410, the electronic device may measure a standby time until a synchronization signal of a second period is generated after a drawing task is completed at operation 1520.

At operation 1430, the electronic device may compose the drawn images in response to the synchronization signal after the drawing. For example, the electronic device may compose the images through an image composition module (surface flinger).

At operation 1440, the electronic device may deliver the composed image to a display controller in response to a periodic synchronization signal. For example, the electronic device may perform a flip operation of delivering the composed image to the display controller.

At operation 1450, the electronic device may display an image on a display panel in response to the generation of the synchronization signal.

At operation 1460, the electronic device may determine an offset value based on the measured standby time. For example, the electronic device may determine the offset value corresponding to a standby time occurring prior to an image composition after image drawing.

In accordance with one embodiment, if the standby time is measured in plural number, the electronic device may determine one of a minimum value of the plurality of measured standby times or an average value of the plurality of measured first standby times to be an offset value. For example, the electronic device may determine an average value or minimum value of standby times to be an offset value based on priority set with respect to the stability or response speed of a display. In accordance with various embodiments, a method for the electronic device to determine an offset value is not limited thereto and may be configured in various ways.

At operation 1470, the electronic device may determine image drawing timing by applying the determined offset value to a periodic synchronization signal. For example, the electronic device may start image drawing after time corresponding to the offset value from the generation of the synchronization signal.

In accordance with various embodiments, the electronic device determines image composition timing by considering a standby time (standby time for a wait for a synchronization signal (vsync) of a next period after an image composition and delivery) until an image is displayed on a display panel after an image composition. Accordingly, responsiveness for screen display and switching according to a user input can be improved because an image is displayed on the display panel without a standby time after an image composition.

Figure 15:
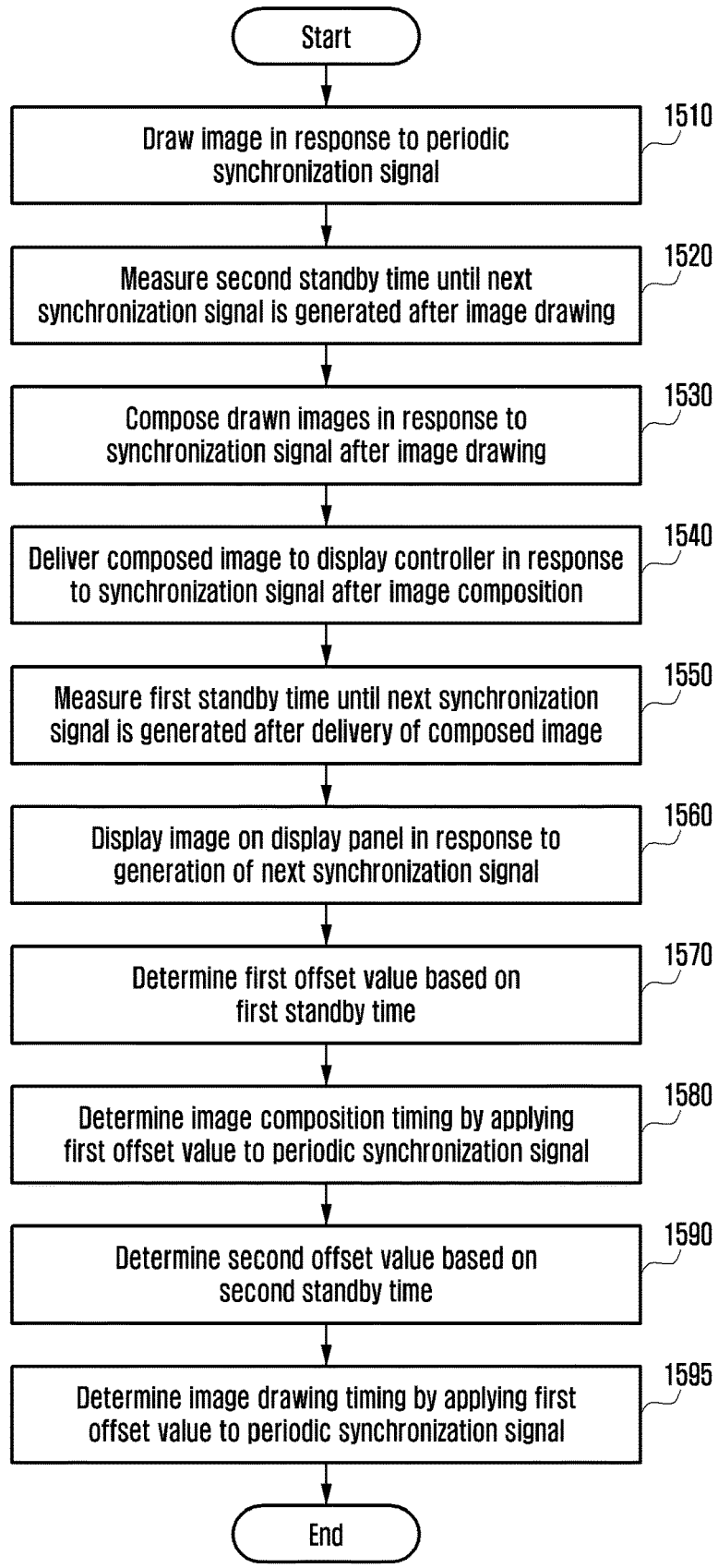
FIG. 15 is a flowchart of a method of controlling an operation of an electronic device according to various embodiments of the present disclosure.

FIG. 15 is a flowchart of a method of controlling an operation of an electronic device according to various embodiments of the present disclosure.

At operation 1510, the electronic device may draw an image in response to a periodic synchronization signal (e.g., vsync signal). For example, the electronic device may draw each image in at least one application.

At operation 1520, the electronic device may measure a second standby time until a synchronization signal of a next period is generated after the drawing. For example, when the electronic device starts drawings in response to a first synchronization signal of a first period at operation 1510, the electronic device may measure a second standby time until a second synchronization signal of a second period is generated after the drawing task is completed at operation 1520.

At operation 1530, the electronic device may compose the drawn images in response to the synchronization signal after the drawing. For example, the electronic device may compose at least one image drawn in a plurality of applications. For example, the electronic device may compose images through an image composition module (surface flinger).

At operation 1540, the electronic device may deliver the composed image to a display controller in response to a periodic synchronization signal. For example, the electronic device may perform a flip operation of delivering the composed image to the display controller.

At operation 1550, the electronic device may measure a first standby time until a next synchronization signal is generated after the delivery of the composed image. For example, the electronic device may measure the first standby time until an image is displayed on a display panel in response to a next synchronization signal after a flip.

At operation 1560, the electronic device may display an image on the display panel in response to the generation of the synchronization signal.

At operation 1570, the electronic device may determine a first offset value based on the first standby time. For example, the electronic device may determine the first offset value corresponding to the first standby time occurring until an image is displayed on the display panel after the image composition and the flip operation.

In accordance with one embodiment, if the first standby time is measured in plural number, the electronic device may determine one of a minimum value of the plurality of measured first standby times or an average value of the plurality of measured first standby times to be the first offset value. For example, the electronic device may repeatedly measure the first standby time for a given period or by a given number. The electronic device may determine the first offset value by analyzing the plurality of measured first standby time based on a set criterion. For example, if the occurrence of a frame drop is to be prevented for stable display, the electronic device may determine a minimum value of the first standby times to be the first offset value. For example, if responsiveness improvement is always to be preferentially considered, the electronic device may determine an average value of the first standby times to be a second offset value.

At operation 1580, the electronic device may determine image composition timing by applying the first offset value to a periodic synchronization signal. For example, the electronic device may start an image composition after time corresponding to the first offset value from the generation of the synchronization signal.

At operation 1590, the electronic device may determine a second offset value based on the second standby time. For example, the electronic device may determine the second offset value corresponding to the second standby time occurring prior to an image composition after image drawing.

In accordance with one embodiment, if the second standby time is measured in plural number, the electronic device may determine one of a minimum value of the plurality of measured second standby times or an average value of the plurality of measured second standby times to be the second offset value. For example, the electronic device may repeatedly measure the second standby time for a given period or by a given number. The electronic device may determine the second offset value by analyzing the plurality of measured second standby times based on a set criterion. For example, if the occurrence of a frame drop is to be prevented for stable display, the electronic device may determine a minimum value of the second standby times to be the second offset value. For example, if responsiveness improvement is always to be preferentially considered, the electronic device may determine an average value of the second standby times to be the second offset value.

At operation 1595, the electronic device may determine image drawing timing by applying the second offset value to a periodic synchronization signal. For example, the electronic device may start image drawing after time corresponding to the second offset value from the generation of the synchronization signal.

In accordance with various embodiments, the electronic device may adjust the first offset value or the second offset value based on the time taken for image drawing or the time taken for an image composition. The electronic device may perform screen switching at more efficient and accurate timing by comprehensively considering an image drawing time and an image composition time.

Figure 16:
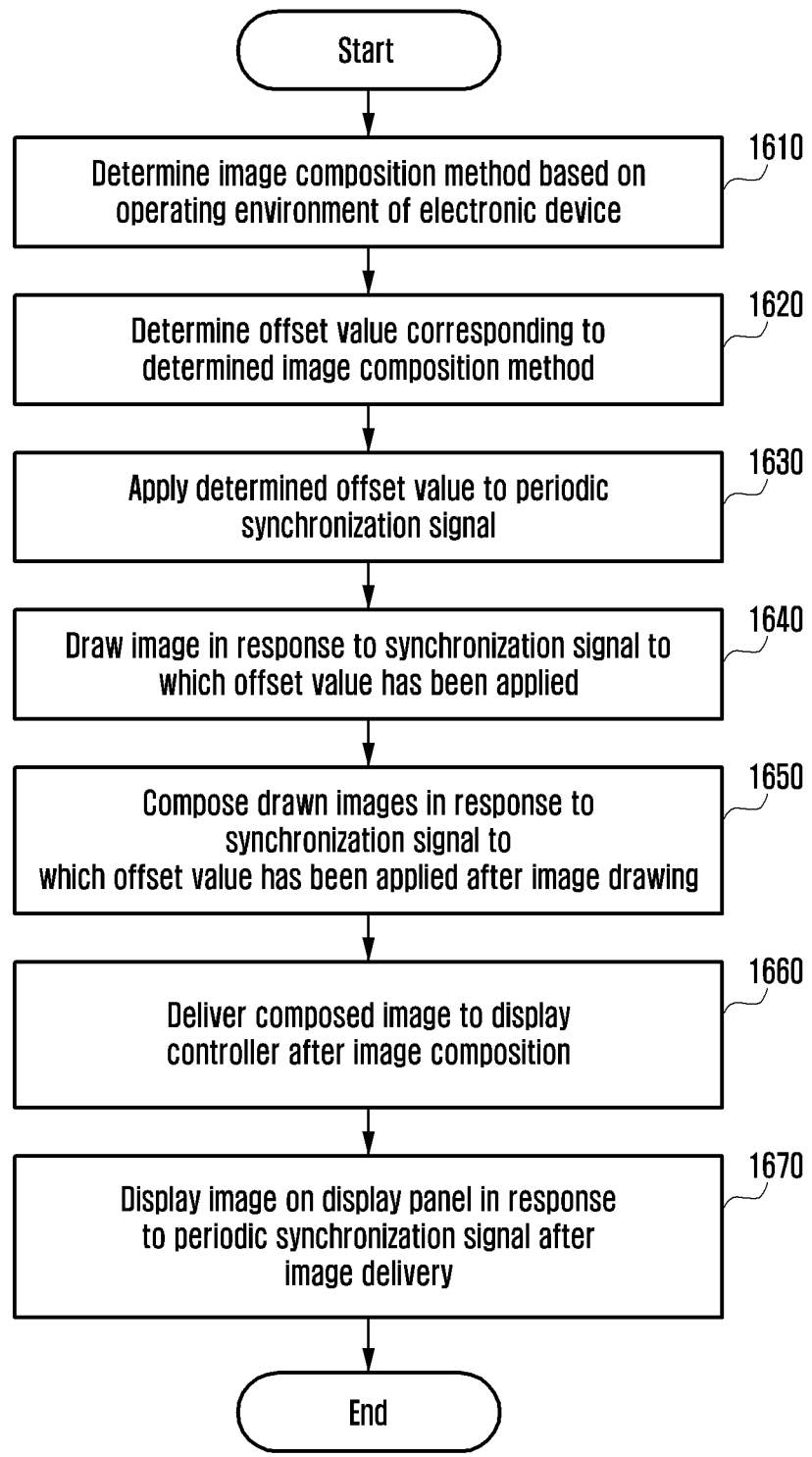
FIG. 16 is a flowchart of a method of controlling an operation of an electronic device according to various embodiments of the present disclosure.

FIG. 16 is a flowchart of a method of controlling an operation of an electronic device according to various embodiments of the present disclosure.

At operation 1610, the electronic device may determine an image composition method based on an operating environment. For example, the operating environment may include information about the number of applications that are being executed to perform drawing, the format of an image to be drawn, and a processing operation (e.g., rotation or scaling) of an image. For example, the image composition method may include a composition method using hardware and a composition method using software. For example, the image composition method may include a using a display controller (e.g., hardware composer (HWC) method) or a method using a GPU (e.g., graphic library embedded system (GLES) method). For example, the electronic device may determine an image composition method in each operation every period (every frame).

At operation 1620, the electronic device may determine an offset value corresponding to the determined image composition method. For example, the time taken for an image composition may be generally maintained within a given range depending on an image composition method. For example, the HWC method may have a shorter time taken for an image composition than the GLES method on average. For example, the electronic device may determine the offset value of each image composition method by considering an average image composition time according to each composition method. In accordance with one embodiment, the electronic device may have previously stored a reference offset value according to an image composition method or may measure the time required upon an image composition according to an image composition method, and may set a reference offset value according to a composition method based on the measured time. In accordance with various embodiments, the electronic device may determine an offset value corresponding to an image composition method determined according to an image composition method determined every period (every frame).

At operation 1630, the electronic device may apply the determined offset value to a periodic synchronization signal (e.g., vsync signal). In accordance with various embodiments, the electronic device may apply an offset value newly determined every frame (every period).

At operation 1640, the electronic device may draw an image in response to a synchronization signal to which the offset value has been applied. For example, the electronic device may start image drawing after time corresponding to the determined offset value from the generation of the synchronization signal.

At operation 1650, the electronic device may compose the drawn images in response to the synchronization signal to which the offset value has been applied after the image drawing. For example, the electronic device may start an image composition after time corresponding to the determined offset value from the generation of the synchronization signal.

At operation 1660, the electronic device may deliver the composed image to the display controller after the image composition. For example, the electronic device may perform a flip operation.

At operation 1670, the electronic device may display an image on a display panel in response to a periodic synchronization signal (e.g., vsync signal). For example, the electronic device may obviate a standby time by considering time upon image drawing and image composition by applying an offset according to an image composition method. Accordingly, the electronic device can display an image in each frame in response to a periodic synchronization signal without an unnecessary standby time.

A method of controlling an operation of an electronic device according to various embodiments of the present disclosure may include an operation of drawing an image in response to a periodic synchronization signal, an operation of composing the drawn image in response to the synchronization signal after the image drawing, an operation of delivering the composed image to a display controller in response to the synchronization signal after the image composition, an operation of measuring a first standby time until a next synchronization signal is generated after the delivery of the composed image, an operation of displaying an image on a display panel in response to the generation of the next synchronization signal, an operation of determining a first offset value based on the first standby time, and an operation of determining image composition timing by applying the first offset value to the periodic synchronization signal.

In accordance with one embodiment, in the method, if the first standby time is measured in plural number, one of a minimum value of the plurality of measured first standby times or an average value of the plurality of measured first standby times may be determined as the first offset value.

In accordance with one embodiment, the method may further include an operation of measuring a second standby time until a next synchronization signal is generated after the image drawing, an operation of determining a second offset value based on the second standby time, and an operation of determining image drawing timing by applying the second offset value to the periodic synchronization signal.

In accordance with one embodiment, in the method, if the second standby time is measured in plural number, one of a minimum value of the plurality of measured second standby times or an average value of the plurality of measured second standby times may be determined as the second offset value.

In accordance with one embodiment, in the method, the method may further include an operation of adjusting the first offset value or the second offset value based on time taken for image drawing or time taken for an image composition.

A method of controlling an operation of an electronic device according to various embodiments of the present disclosure may include an operation of determining an image composition method based on an operating environment of the electronic device, an operation of determining an offset value corresponding to the determined image composition method, an operation of applying the determined offset value to a periodic synchronization signal, an operation of drawing an image in response to the synchronization signal to which the offset value has been applied, an operation of composing the drawn image in response to the synchronization signal to which the offset value has been applied after the image drawing, an operation of delivering the composed image to the display controller after the image composition, and an operation of displaying an image on a display panel in response to the periodic synchronization signal after the image delivery.

In accordance with one embodiment, the image composition method may include an image composition method through a display controller and an image composition method through a GPU.

In accordance with one embodiment, the operating environment of the electronic device may include the number of applications being executed to draw an image.

The "module" used in this document may include a unit including hardware, software or firmware and may be interchangeably used with a term, for example, logic, a logical block, a part or a circuit. The "module" may be an integrated part, a minimum unit to perform one or more functions, or a part thereof. The "module" may be implemented mechanically or electronically, and may include an application-specific integrated circuit (ASIC) chip, field-programmable gate arrays (FPGAs) or a programmable logic device which performs some operations and which has been known or is to be developed, for example. At least some of a device (e.g., modules or functions thereof) or method (e.g., operations) according to various embodiments may be implemented as instructions stored in a computer-readable storage medium (e.g., the memory 130) in the form of a program module. If the instructions are executed by a processor (e.g., the processor 120), the processor may perform functions corresponding to the instructions. The computer-readable storage medium may include a hard disk, a floppy disk, magnetic media (e.g., magnetic tape), optical media (e.g., CD-ROM), a DVD, magneto-optical media (e.g., a floptical disk), and embedded memory. The instructions may include code generated by a compiler or code executable by an interpreter. The module or program module according to various embodiments may include at least one of the aforementioned elements, may omit some of the elements or may further include other elements. Operations performed by the module, program module or other elements according to various embodiments may be executed in a sequential, parallel, repetitive or heuristic manner or at least some operations may be executed in a different sequence or omitted or may further include other operations.

The invention claimed is:

1. An electronic device, comprising:
a display panel;
a display controller;
a memory; and
a processor electrically connected to the display panel, the display controller and the memory,
wherein the memory is configured to store instructions that, when executed, cause the processor to:
draw an image in response to a periodic synchronization signal,
compose the drawn image in response to the synchronization signal after the image drawing,
measure a first standby time until the drawn image is composed after the image drawing,
deliver the composed image to the display controller in response to the synchronization signal after the image composition,
measure a second standby time until the composed image on the display panel in a next synchronization signal is displayed after the delivery of the composed image,
control the display panel to display an image in response to generation of the next synchronization signal,
determine a first offset value based on the first standby time and a second offset value based on the second standby time,
determine timing for drawing and composing an image within a single synchronization signal period by applying the first offset value and the second offset value to the periodic synchronization signal, respectively, and
draw and compose the image in the single synchronization signal period to which the first offset value and the second offset value are applied instead of an existing synchronization signal.

2. The electronic device of claim 1, wherein the instructions cause the processor to determine one of a minimum value of a plurality of measured first standby times or an average value of the plurality of measured first standby times to be the first offset value if the first standby time is measured in plural number.

3. The electronic device of claim 1, wherein the instructions cause the processor to:
determine image drawing timing by applying the first offset value to the periodic synchronization signal, and
determine image composition timing by applying the second offset value to the periodic synchronization signal.

4. The electronic device of claim 3, wherein the instructions cause the processor to determine one of a minimum value of a plurality of measured second standby times or an average value of the plurality of measured second standby times to be the second offset value if the second standby time is measured in plural number.

5. The electronic device of claim 3, wherein the instructions cause the processor to adjust the first offset value or the second offset value based on time taken for image drawing or time taken for an image composition.

6. An electronic device, comprising:
a display panel;
a display controller;
a memory;
a graphic processing unit (GPU); and
a processor electrically connected to the display panel, the display controller and the memory,
wherein the memory is configured to store instructions that, when executed, cause the processor to:
determine an image composition method from among a hardware composition method using the display controller and a software composition method using the GPU,
determine an offset value corresponding to the determined image composition method, wherein the offset value is a first offset value when the determined image composition method is the hardware composition method and is a second offset value when the determined image composition method is the software composition method, the first offset value being different from the second offset value,
form a delayed periodic synchronization signal by applying the determined first or second offset value to a periodic synchronization signal,
draw a plurality of images in response to the delayed periodic synchronization signal,
compose the plurality of drawn images in response to the delayed periodic synchronization signal,
deliver the composed image to the display controller when the image composition is completed, and control the display panel to display the delivered composed image in response to the periodic synchronization signal after the image delivery, wherein the first offset value is determined based on a minimum value of standby times until an image composition start after drawing, and wherein the second offset value is determined based on a minimum value of standby times until the display panel displays an image.

7. The electronic device of claim 6, wherein an operating environment of the electronic device comprises a number of applications being executed to draw an image.

8. A method of controlling an operation of an electronic device, comprising:

drawing an image in response to a periodic synchronization signal;

composing the drawn image in response to the synchronization signal after the image drawing;

measuring a first standby time until the drawn image is composed after the image drawing;

delivering the composed image to a display controller in response to the synchronization signal after the image composition;

measuring a second standby time until the composed image on a display panel in a next synchronization signal is displayed after the delivery of the composed image;

displaying an image on a display panel in response to generation of the next synchronization signal;

determining a first offset value based on the first standby time and a second offset value based on the second standby time;

determining timing for drawing and composing an image within a single synchronization signal period by applying the first offset value and the second offset value to the periodic synchronization signal, respectively; and drawing and composing the image in the single synchronization signal period to which the first offset value and the second offset value are applied instead of an existing synchronization signal.

9. The method of claim 8, wherein if the first standby time is measured in plural number, one of a minimum value of a plurality of measured first standby times or an average value of the plurality of measured first standby times is determined as the first offset value.

10. The method of claim 8, further comprising:

determining image drawing timing by applying the first offset value to the periodic synchronization signal; and determining image composition timing by applying the second offset value to the periodic synchronization signal.

11. The method of claim 10, wherein if the second standby time is measured in plural number, one of a minimum value of a plurality of measured second standby times or an average value of the plurality of measured second standby times is determined as the second offset value.

12. The method of claim 10, further comprising:

adjusting the first offset value or the second offset value based on time taken for image drawing or time taken for an image composition.

13. A method of controlling an operation of an electronic device comprising a display controller and a graphic processing unit (GPU), the method comprising:

determining an image composition method from among a hardware composition method using the display controller and a software composition method using the GPU;

determining an offset value corresponding to the determined image composition method, wherein the offset value is a first offset value when the determined image composition method is the hardware composition method and is a second offset value when the determined image composition method is the software composition method, the first offset value being different from the second offset value;

forming a delayed periodic synchronization signal by applying the determined first or second offset value to a periodic synchronization signal;

drawing a plurality of images in response to the delayed periodic synchronization signal;

composing the plurality of drawn images in response to the delayed periodic synchronization signal;

delivering the composed image to the display controller when the image composition is completed; and displaying the delivered composed image on a display panel in response to the periodic synchronization signal after the image delivery, wherein the first offset value is determined based on a minimum value of standby times until an image composition start after drawing, and wherein the second offset value is determined based on a minimum value of standby times until the display panel displays an image.

14. The method of claim 13, wherein an operating environment of the electronic device comprises a number of applications being executed to draw an image.

* * * * *